United States Patent
Zhang et al.

(10) Patent No.: US 9,491,024 B2
(45) Date of Patent: Nov. 8, 2016

(54) METHODS FOR FREQUENCY OFFSET ESTIMATION WITH ZADOFF-CHU SEQUENCES

(71) Applicant: Hong Kong Applied Science and Technology Research Institute Co., Ltd., Shatin, New Territories, HK (CN)

(72) Inventors: Yuxian Zhang, Shaoguan (CN); Honglei Zhang, Hong Kong (CN); Victor Kwan, Shatin (CN); Eric Tsang, Hong Kong (CN)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 0 days.

(21) Appl. No.: 14/614,157

(22) Filed: Feb. 4, 2015

(65) Prior Publication Data
US 2016/0226696 A1    Aug. 4, 2016

(51) Int. Cl.
H04L 27/26    (2006.01)

(52) U.S. Cl.
CPC ....... *H04L 27/2663* (2013.01); *H04L 27/2659* (2013.01)

(58) Field of Classification Search
CPC ............. H04L 27/2659; H04L 27/266; H04L 27/2663
See application file for complete search history.

(56) References Cited

U.S. PATENT DOCUMENTS

| | | | |
|---|---|---|---|
| 6,618,452 B1 * | 9/2003 | Huber | H04L 27/2607 370/512 |
| 6,993,094 B1 * | 1/2006 | Eberlein | H04L 27/2613 375/326 |
| 7,627,059 B2 | 12/2009 | Niu et al. | |
| 8,270,528 B2 | 9/2012 | Zeng et al. | |
| 8,532,233 B2 * | 9/2013 | Shimomura | H04J 13/0062 370/320 |
| 8,797,994 B2 | 8/2014 | Oketani | |
| 8,848,844 B2 | 9/2014 | Hyll et al. | |
| 2009/0011722 A1 * | 1/2009 | Kleider | H04B 1/59 455/101 |
| 2009/0238137 A1 * | 9/2009 | Kishiyama | H04J 13/0062 370/330 |

(Continued)

FOREIGN PATENT DOCUMENTS

| | | |
|---|---|---|
| CN | 103338508 A | 10/2013 |
| WO | WO-2010040204 A1 | 4/2010 |
| WO | WO-2013172748 A1 | 11/2013 |

OTHER PUBLICATIONS

Perisa, Ivan, et al., "Frequency Offset Estimation Based on Phase Offsets Between Sample Correlations", Department of Information Technology, University of Ulm, Germany, 4 pages.

(Continued)

*Primary Examiner* — David B. Lugo
(74) *Attorney, Agent, or Firm* — Norton Rose Fulbright US LLP

(57) ABSTRACT

A method for performing high speed mode detection of a carrier frequency offset (CFO) includes receiving a Zadoff-Chu signal at a wireless device, and determining a plurality of correlation peaks based on a correlation of the signal with one or more known Zadoff-Chu sequences. The method includes determining a carrier frequency offset (CFO) associated with the signal based on a phases associated with the plurality of correlation peaks and a coarse CFO estimate. The coarse CFO estimate may be determined based on a squared power ratio of particular pairs of the plurality of correlation peaks and the phases may be used to remove ambiguity associated with the coarse CFO estimate.

36 Claims, 14 Drawing Sheets

(56) References Cited

U.S. PATENT DOCUMENTS

2011/0026649 A1* 2/2011 Lipka .................. H04L 27/2659
375/343
2013/0136216 A1* 5/2013 Shirakata ............ H04L 27/0014
375/343

OTHER PUBLICATIONS

Yucek, Tevfik et al., "Joint Channel and Frequency Offset Estimation for OFDM Systems", University of South Florida, Raytheon Company, 6 pages.

* cited by examiner

METHODS FOR FREQUENCY OFFSET ESTIMATION WITH ZADOFF-CHU SEQUENCES

TECHNICAL FIELD

The present disclosure is generally related to determining a carrier frequency offset in a wireless communication system. More particularly, the present disclosure is related to determining a carrier frequency offset in a wireless communication system based on a phase of correlation peaks associated with a received wireless signal.

BACKGROUND

In wireless communication systems (e.g., an orthogonal frequency division multiplexing (OFDM) system) a carrier frequency offset (CFO) may occur between a receiver (e.g., a base station) and a transmitter (e.g., a wireless device), which may degrade the performance of such wireless communication systems (e.g., long term evolution (LTE) systems and/or LTE-advanced systems). CFO may occur due to frequency deviation of oscillators of the transmitter and receiver, respectively, and may also occur due to Doppler shift caused by movement of the receiver, the transmitter, or both. CFO may cause the performance of the wireless communication system to degrade, thereby reducing the quality of service that may be provided to the receiver. For example, CFO may cause loss of synchronization between the transmitter and the receiver, which may cause loss of service (e.g., a dropped call, etc.). Additionally, CFO may increase the power consumption of the transmitter and/or the receiver (e.g., due to more frequent attempts to gain synchronization between the receiver and the transmitter).

SUMMARY

Systems, methods, apparatuses, and computer-readable storage media for determining a carrier frequency offset (CFO) associated with a received signal are disclosed. In an embodiment, the systems, methods, apparatuses, and computer-readable storage media for determining the CFO may utilize a characteristic associated with power of a correlation output and a characteristic associated with a phase of the correlation output to determine the CFO offset. In an embodiment, the correlation output may be obtained from a Zadoff-Chu sequence. Using both the characteristic associated with the power of the correlation output and the characteristic associated with the phase of the correlation output may increase an accuracy of the CFO estimate. CFO estimates determined according to embodiments may be suitable for a High Speed Train (HST) scenario (e.g., embodiments may determine the CFO with improved accuracy when a device transmitting the signal is travelling at speeds up to 350 km per hour). Further, CFO estimates of embodiments may be suitable for other scenarios, such as when the signal is transmitted by a device travelling aboard an aircraft, a watercraft, or another land-based vehicle travelling at high speed.

In an embodiment, when a signal is received from a device operating in an HST scenario, the signal may be correlated with at least one known sequence (e.g., a Zadoff-Chu root sequence having a zero-autocorrelation property), which may cause a device receiving the signal to observe a plurality of peaks as a result of the correlation, where the peaks may include a left peak, a main peak, and a right peak, and where the correlation generates complex values representative of an amplitude or magnitude of each of the plurality of peaks. Additionally, a preamble index may be determined based on the received signal. In an embodiment, squared power ratios associated with the plurality of peaks may be determined based on the magnitude of the plurality of peaks, and the squared power ratios may be compared to pre-determined squared power ratios associated with CFO candidates to determine a coarse CFO estimate. In an embodiment, comparing the squared power ratios associated with the plurality of peaks of the received to the pre-determined squared power ratios associated with CFO candidates may be performed using a lookup table, where the pre-determined squared power ratios associated with CFO candidates are stored in the lookup table.

In an embodiment, a phase of at least one peak of the plurality of peaks may be determined and may be used to determine a final CFO estimate, where the final CFO estimate may be used to configure subsequent communications between the device transmitting the signal and the device receiving the signal. In an embodiment, determining the final CFO estimate may include comparing the phase of the at least one peak of the received signal to a phase of a peak associated with a known CFO, where the final CFO estimate may be determined based at least in part on the comparison of the phase of the at least one peak associated with the received signal to the phase of the peak associated with the known CFO. In an embodiment, a sign of the final CFO estimate may be determined based on the comparison phase of the at least one peak associated with the received signal to the phase of the peak associated with the known CFO. The phase comparison may be used to resolve an ambiguity in the coarse CFO estimate that may arise in some HST scenarios.

The foregoing has outlined rather broadly the features and technical advantages of the present disclosure in order that the detailed description of the embodiments that follows may be better understood. Additional features and advantages of the embodiments will be described hereinafter which form the subject of the claims of the present disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of the embodiments, both as to their organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the embodiments of the present disclosure, reference is now made to the following descriptions taken in conjunction with the accompanying drawings, in which.

DETAILED DESCRIPTION

Figure 1:
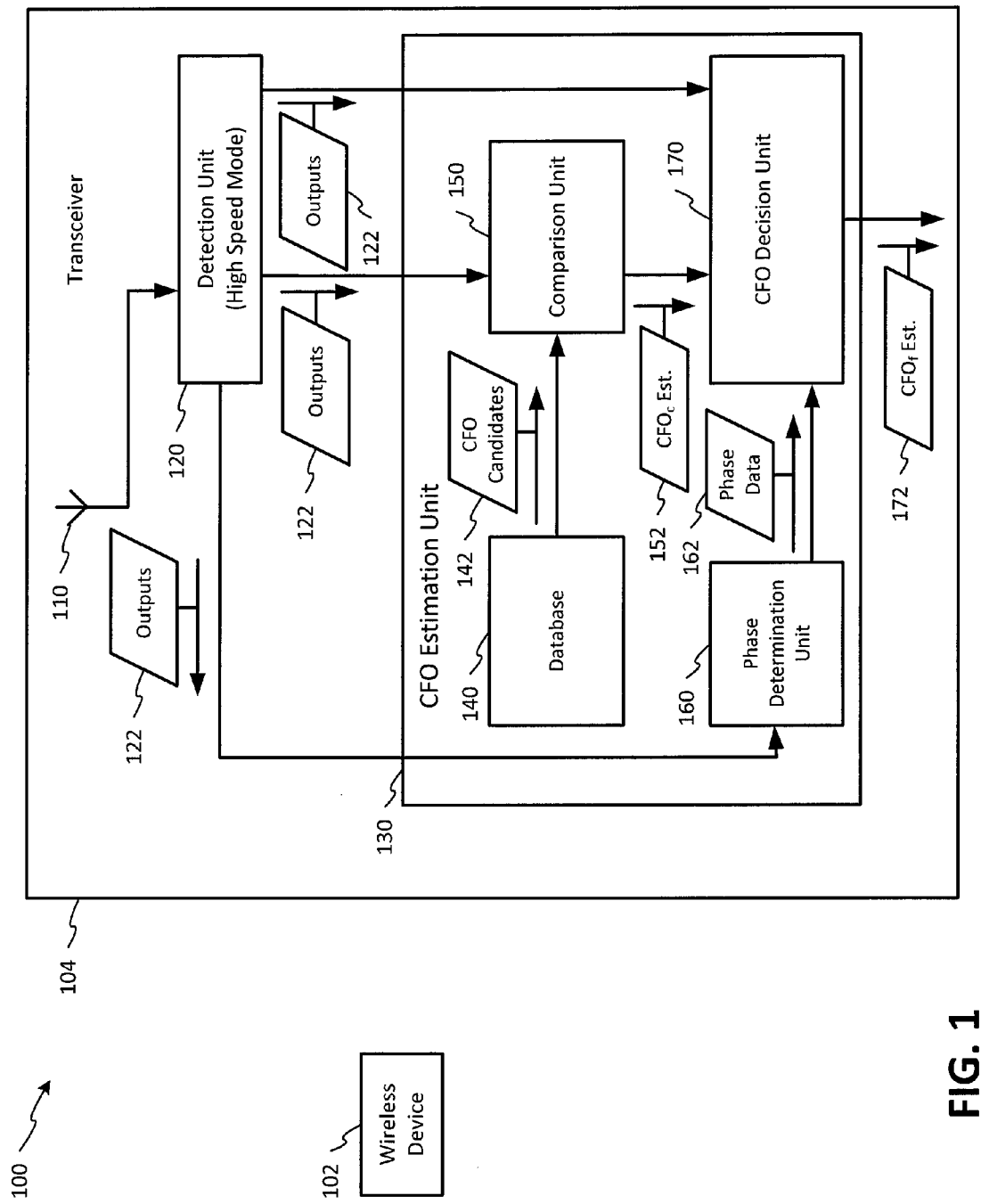
FIG. 1 is a block diagram of a system for determining a carrier frequency offset (CFO) associated with a received signal using a high speed detection mode.

Referring to FIG. 1, a block diagram of a system for determining a carrier frequency offset (CFO) associated with a received signal using a high speed detection mode is shown as a system 100. As shown in FIG. 1, the system 100 may include a wireless device 102 and a transceiver 104. The transceiver 104 may be adapted to transmit a wireless signal to the wireless device 102, and to receive data from the wireless device 102. For example, in an embodiment, the transceiver 104 may be a base station (e.g., an evolved nodeB (eNB), a femto cell, a macro cell, a pico cell, etc.) operating in wireless communication network (e.g., a cellular communication network, a cellular data network, a wireless local area network (WLAN), etc.) according to one or more standards/protocols (e.g., a $3^{rd}$ Generation (3G) standard, $4^{th}$ Generation (4G)/long term evolution (LTE) standard, an LTE advanced standard, an 802.11 wireless communication protocol, etc.), and may adapted to establish a wireless connection to the wireless device 102. The wireless connection may enable the wireless device 102 to send and receive data to/from one or more remote devices (not shown in FIG. 1). In an embodiment, the wireless device 102 may be a smartphone, a cellular phone, a personal digital assistant (PDA), a laptop computing device, a tablet computing device, a personal computing device, or another device adapted to operate according to embodiments.

It is noted that the wireless device 102 and/or the transceiver 104 may include one or more processors (e.g., digital signal processors (DSPs), central processing units (CPUs), a single CPU including two or more processing cores, etc.) and a memory (e.g., random access memory (RAM), read only memory (ROM), hard disk drives(s) (HDDs), solid state drive(s) (SSDs), or other types of memory devices for storing data in a persistent or non-persistent state). In an embodiment, the memories of the wireless device 102 and the transceiver 104 may store instructions that, when executed by the respective one or more processors, cause the respective one or more processors to perform operations described in connection with the wireless device 102 and the transceiver 104, respectively, with reference to FIGS. 1-14.

When establishing the wireless connection between the transceiver 104 and the wireless device 102, the wireless device 102 may transmit a signal to the transceiver 104. In some use cases, the signal may be associated with a CFO. For example, when the wireless device 102 is moving, the signal may be associated with a CFO caused Doppler shift induced by the velocity of the wireless device 102 relative to the transceiver 104 (which may be stationary). Additionally, the signal may be associated with a CFO caused by frequency deviation between oscillators in the wireless device 102 and the transceiver 104. The CFO may cause inter-carrier-interference (ICI) in the frequency domain, which may degrade performance of the system 100. Additionally, in the time domain, the signal may be distorted by a varying phase shift induced by the CFO. To mitigate the CFO's impact on the signal, some standards impose requirements that attempt to constrain the CFO. For example, in some communication standards, wireless device CFO adaptation has +/-0.1 ppm accuracy requirement (e.g., +/-240 Hz CFO for a 2.4 GHz carrier frequency). While such requirements are suitable for many use cases, there are some use cases for which such requirements are not suitable.

For example, use of high speed trains (HSTs) has become widespread, and such trains are capable of travelling at speeds of approximately 350 kilometers/hour (km/h). In such instances, a signal transmitted by a wireless device (e.g., the wireless device 102) aboard the HST may realize a CFO of +/-1340 Hz due to the rate of travel of the HST. Thus, wireless devices aboard the HST may experience degraded service and system performance with respect to a wireless communication network (e.g., a wireless communication network including the transceiver 104) due to inaccuracies associated with CFO estimates.

Figure 2:
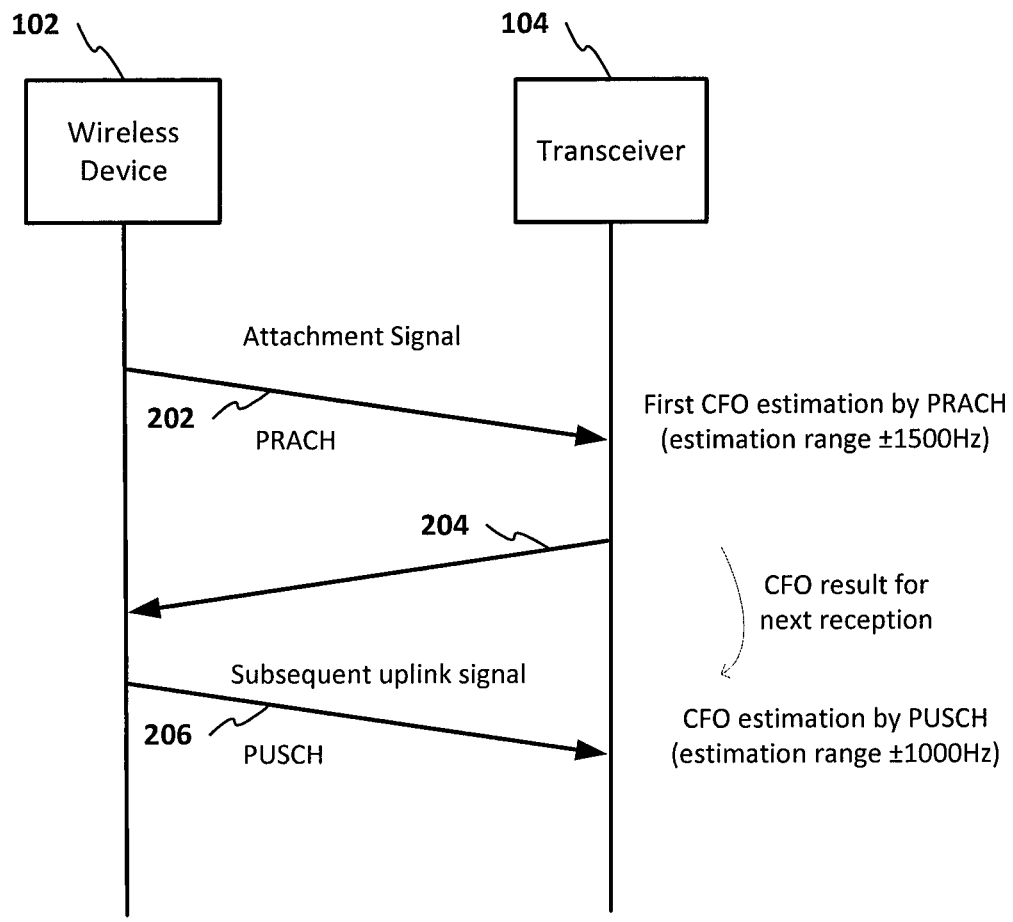
FIG. 2 is a ladder diagram illustrating an embodiment of a method of establishing and maintaining a connection between a wireless device and a transmitter in a high speed train (HST) operating environment.

To illustrate, and referring to FIG. 2, a ladder diagram illustrating an embodiment of a method of establishing and maintaining a connection between a wireless device and a transmitter is shown. As shown in FIG. 2, the wireless device 102 may transmit an attachment signal 202 to the transceiver 104. In an embodiment, the attachment signal 202 may be transmitted using a physical random access channel (PRACH). In an embodiment, due to the operation of the wireless device 102 in a high speed train (HST) operating environment, the attachment signal 202 may be associated with a carrier frequency offset (CFO) up to +/-1340 Hz. As shown in FIG. 2, the transceiver 104 may determine a first CFO estimate using the attachment signal 202 received via the PRACH. Due to the configuration of signals (e.g., a structure of reference signals) transmitted using the PRACH, a CFO estimation range associated with PRACH may be +/−1500 Hz. Because the CFO estimation range of signals transmitted using the PRACH is greater than the maximum CFO associated with the attachment signal (e.g., +/−1500 Hz>+/−1340 Hz), the CFO may be estimated by the transceiver 104 according to embodiments.

In response to receiving the attachment signal 202, the transceiver 104 may transmit a random access response message 204 to the wireless device 102. Subsequently, the wireless device 102 may transmit subsequent uplink signals 206 to the transceiver 104. In an embodiment, the subsequent uplink signals 206 may transmitted using a physical uplink shared channel (PUSCH). The CFO estimation range for signals transmitted using the PUSCH may be +/−1000 Hz (e.g., due to the structure of the reference signals transmitted on the PUSCH), which may introduce errors into the CFO estimated based on signals received via the PUSCH (e.g., based on the subsequent uplink signals 206). For example, because the CFO estimation range of the PUSCH is less than the CFO associated with the attachment signal (e.g., +/−1000 Hz<+/−1340 Hz), a CFO estimated by the transceiver 104 based on the subsequent uplink signals 206 may be inaccurate, and, over time, such inaccuracies may degrade the performance of the system 100.

Such inaccuracies may be corrected using the CFO estimated using the attachment signal 202 received via the PRACH. However, ambiguity may also occur within the attachment signal 202 received via the PRACH under some conditions (e.g., a low signal-to-noise ratio (SNR) associated with the attachment signal 202, and/or when a normalized CFO associated with the attachment signal 202 is small), as described in more detail below. Thus, although inaccuracies associated with estimating the CFO based on the subsequent uplink signals 206 may be correcting using an estimate of the CFO based on the attachment signal 202 received via the PRACH, ambiguities in the CFO estimate determined using PRACH may result in an incorrect CFO estimate, which may reduce the effectiveness of using the CFO estimate associated with the PRACH to correct the CFO estimates determined using the signals received via the PUSCH. As described in more detail below, one or more embodiments of the present disclosure provide a method for resolving the ambiguity of CFO estimations using PRACH, as described in more detail below.

Referring back to FIG. 1, the transceiver 104 may include one or more antennas 110, a detection unit 120, and a CFO estimation unit 130. The CFO estimation unit 130 may be configured to determine a CFO estimate associated with a signal received from the wireless device 102. In an embodiment, the CFO estimation unit 130 may be configured to determine the CFO based on a signal received using a physical random access channel (PRACH) in accordance with embodiments. As shown in FIG. 1, the CFO estimation unit 130 may include a database 140, a power comparison unit 150, a phase determination unit 160, and a CFO decision unit 170. In an embodiment, the database 140 may store information associated with a plurality of CFO candidates, as described in more detail below.

During operation of the transceiver 104 of embodiments, the transceiver 104 may receive a signal at the one or more antennas 110, and may provide the received signal to the detection unit 120. In an embodiment, the signal may be received from the wireless device 102 at the one or more antennas 110 via the PRACH while the wireless device 102 is operating in an HST scenario. That is to say that the signal may be received at the transceiver 104 while the wireless device 102 is aboard an HST travelling at a speed of up to 350 km/h. In an embodiment, the detection unit 120 may include a filter and a correlator (not shown in FIG. 1). The filter may filter the received signal to produce a filtered signal, and may provide the filtered signal to the correlator, which may correlate the received signal with one or more known local sequences to generate one or more correlation outputs. In an embodiment, each of the one or more correlation outputs may have a constant amplitude. In an embodiment, the known local sequence may be a root Zadoff-Chu (ZC) sequence (e.g., a ZC sequence that has not been cyclically shifted), and the correlation outputs may be associated with a correlation of the known local sequence and the received signal, which may cause one or more delta functions to be observed in the correlator. A single correlation output (e.g., a single peak of constant amplitude) may be observed in the correlator when CFO is small, and three correlation outputs (e.g., three peaks of constant amplitude) may be observed when CFO is large, such as in an HST scenario.

Figure 3:
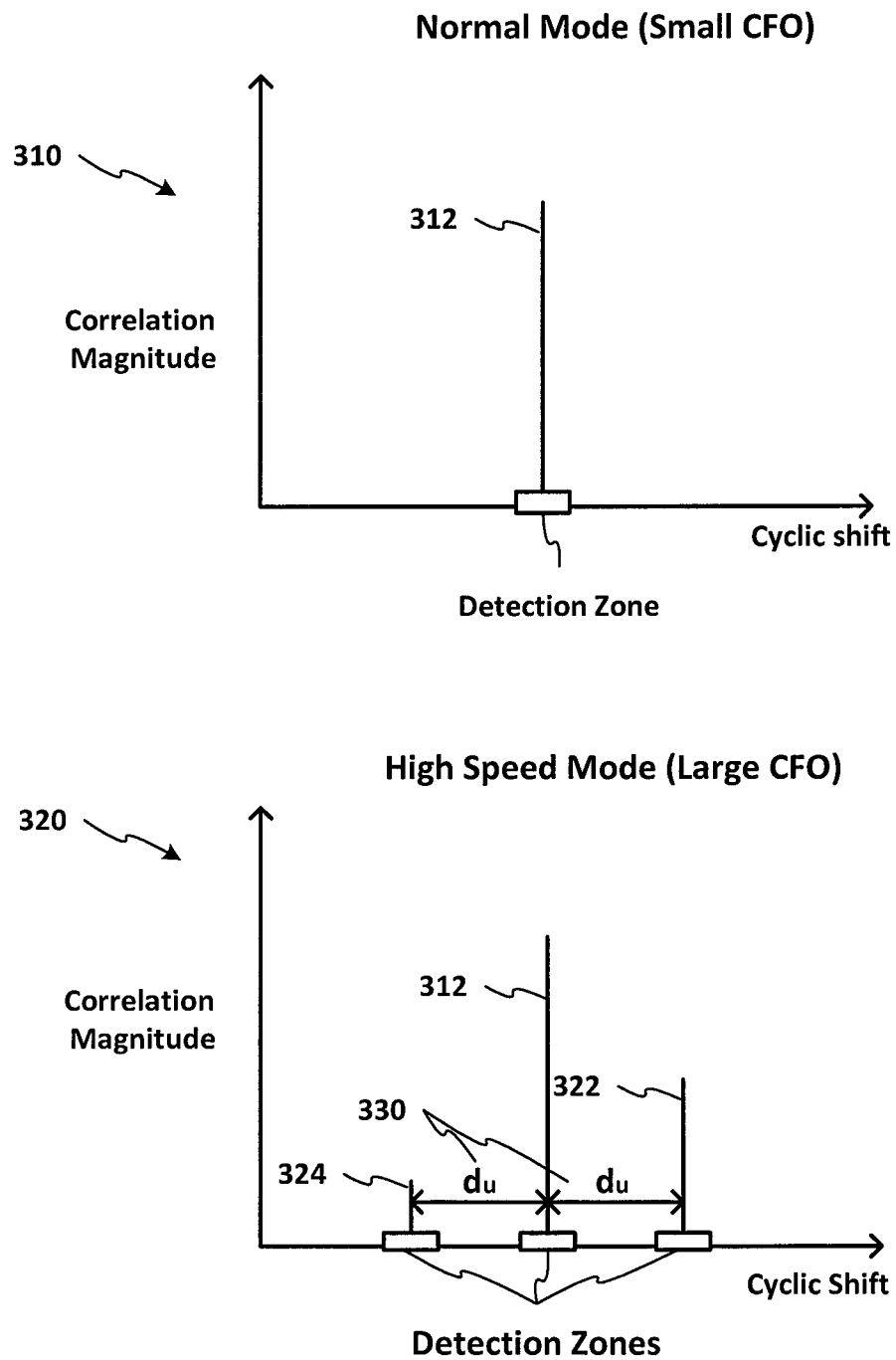
FIG. 3 depicts diagrams illustrating correlation outputs representative of signals associated with different carrier frequency offsets (CFOs) according to embodiments.

For example, and referring to FIG. 3, diagrams illustrating correlation outputs representative of signals associated with different carrier frequency offsets (CFOs) according to embodiments are shown. In FIG. 3, a first diagram 310 illustrates that, for a signal associated with a small CFO, a main peak ($P_0$) 312 (e.g., a single correlation output) of constant magnitude may be observed by the correlator in response to correlating the signal with a known local sequence. Additionally, as shown in the first diagram 310, the main peak 312 may be observed at a first detection zone.

In FIG. 3, a second diagram 320 illustrates that, for signals associated with a large CFO (e.g., a CFO associated with a signal transmitted in an HST scenario), the main peak ($P_0$) 312 may be observed by the correlator at the first detection zone, a right peak ($P_1$) of constant magnitude may be observed by the correlator at a second detection zone, and a left peak ($P_{-1}$) of constant magnitude may be observed by the correlator at a third detection zone, where the second and third detection zones are spaced apart from the first detection zone by a distance (du). In an embodiment, the second and third detection zones may be associated with potential ambiguities in the CFO associated with the received signal. It is noted that the power (e.g., the magnitude) of $P_0$, $P_1$, and $P_{-1}$ may vary based on the CFO, and therefore, may be mapped to the CFO estimate. However, it is noted that determining the CFO estimate based only on mapping the power of $P_0$, $P_1$, and $P_{-1}$ may result in an incorrect CFO estimate, as described in more detail below.

Referring back to FIG. 1, the detection unit 120 may determine one or more peaks associated with the signal by correlating the signal with the local root sequence (e.g., a Zadoff-Chu sequence or another sequence having a zero autocorrelation property). In an embodiment, the received Zadoff-Chu sequence with cyclic shift 0 and frequency offset $\Delta f$ may be given by:

$$x_u(n) \cdot e^{j\frac{2\pi \cdot \Delta f \cdot n}{N}} = e^{-j\frac{\pi \cdot u \cdot n(n+1)}{N}} \cdot e^{j\frac{2\pi \cdot \Delta f \cdot n}{N}},$$

$$= e^{-j\frac{\pi \cdot u \cdot (n-du)(n-du+1)}{N}} \cdot$$

$$e^{-j\frac{\pi}{N} \cdot [u \cdot du(2n+1) - u \cdot du^2 - 2n \cdot \Delta f]},$$

$$= x_u(n - du) \cdot e^{j\frac{2\pi \cdot n}{N}(\Delta f - u \cdot du)} \cdot$$

$$e^{-j\frac{\pi}{N} \cdot u \cdot du(1 - du)},$$

$$= x_u(n - du) \cdot e^{j\frac{2\pi \cdot n}{N}(\Delta f - 1)} \cdot$$

$$e^{-j\frac{\pi}{N} \cdot (1 - du) - j\pi \cdot (1 - du)},$$

$$= x_u(n - du) \cdot e^{j\frac{2\pi \cdot n}{N}(\Delta f - 1)} \cdot$$

$$e^{j\theta_u},$$

Equation 1

$n = 0, 1, \ldots, N - 1$.

In equation 1, u may be the root index of the Zadoff-Chu sequence, $\Delta f$ may be the frequency offset, N may be the length of the Zadoff-Chu sequence, $j = \sqrt{-1}$ may be the unit of imaginary part, du may be a cyclic shift, and $\theta_u$ may be regarded as a constant phase shift.

In an embodiment, the detection unit 120 may also determine one or more peaks based on the correlation. For example, the one or more peaks observed by the correlator may include a plurality of peaks, where the plurality of peaks include a main peak ($P_0$), a right peak ($P_1$), and a left peak ($P_{-1}$). In an embodiment, the main peak ($P_0$) may be given by:

$$P_0 = \sum_{n=0}^{N-1} x_u^*(n) \cdot x_u(n) \cdot e^{j\frac{2\pi \cdot \Delta f \cdot n}{N}},$$

$$= \sum_{n=0}^{N-1} e^{j\frac{2\pi \cdot \Delta f \cdot n}{N}},$$

$$= \frac{1 - e^{j2\pi \cdot \Delta f}}{1 - e^{j\frac{2\pi \cdot \Delta f}{N}}}.$$

Equation 2

In equation 2, u may be the root index of the Zadoff-Chu sequence, $\Delta f$ may be the frequency offset, N may be the length of the Zadoff-Chu sequence, $j = \sqrt{-1}$ may be the unit of imaginary part, and where * denotes a complex conjugate.

In an embodiment, the right peak ($P_1$) may be given by:

$$P_1 = \sum_{n=0}^{N-1} x_u^*(n - du) \cdot x_u(n) \cdot e^{j\frac{2\pi \cdot \Delta f \cdot n}{N}},$$

$$= \sum_{n=0}^{N-1} x_u^*(n - du) \cdot x_u(n - du) \cdot e^{j\frac{2\pi \cdot n}{N}(\Delta f - 1)} \cdot e^{j\theta_u},$$

$$= e^{j\theta_u} \cdot \sum_{n=0}^{N-1} e^{j\frac{2\pi \cdot n}{N}(\Delta f - 1)},$$

$$= \frac{1 - e^{j2\pi \cdot (\Delta f - 1)}}{1 - e^{j\frac{2\pi \cdot (\Delta f - 1)}{N}}} \cdot e^{j\theta_u},$$

$$= \frac{1 - e^{j2\pi \cdot \Delta f}}{1 - e^{j\frac{2\pi \cdot (\Delta f - 1)}{N}}} \cdot e^{j\theta_u}..$$

Equation 3

In equation 3, u may be the root index of the Zadoff-Chu sequence, $\Delta f$ may be the frequency offset, N may be the length of the Zadoff-Chu sequence, $j = \sqrt{-1}$ may be the unit of imaginary part, du may be a cyclic shift, and $\theta_u$ may be regarded as a constant phase shift.

In an embodiment, the ratio of the complex value between the right peak ($P_1$) and the main peak ($P_0$) may be given by:

$$\frac{P_1}{P_0} = \frac{1 - e^{j\frac{2\pi \cdot \Delta f}{N}}}{1 - e^{j\frac{2\pi \cdot (\Delta f - 1)}{N}}} \cdot e^{-j\frac{\pi}{N} \cdot (1 - du) - j\pi \cdot (1 - du)}..$$

Equation 4

In equation 4, u may be the root index of the Zadoff-Chu sequence, $\Delta f$ may be the frequency offset, N may be the length of the Zadoff-Chu sequence, $j = \sqrt{-1}$ may be the unit of imaginary part, du may be a cyclic shift.

In an embodiment, similarly, the ratio of the complex value between the left peak ($P_{-1}$) and the main peak ($P_0$) may be given by:

$$\frac{P_{-1}}{P_0} = \frac{1 - e^{j\frac{2\pi \cdot \Delta f}{N}}}{1 - e^{j\frac{2\pi \cdot (\Delta f + 1)}{N}}} \cdot e^{j\frac{\pi}{N} \cdot (1 + du) + j\pi \cdot (1 + du)}..$$

Equation 5

In equation 5, u may be the root index of the Zadoff-Chu sequence, $\Delta f$ may be the frequency offset, N may be the length of the Zadoff-Chu sequence, $j = \sqrt{-1}$ may be the unit of imaginary part, du may be a cyclic shift.

The detection unit 120 may generate an output 122 that may be passed to the power comparison unit 150, the phase determination unit 160, and the CFO decision unit 170. In an embodiment, the output 122 may include a peak data associated with each of the peaks observed in the correlator. In an embodiment, the peak data may include a complex value representative of both the power (or magnitude) and phase of each of the observed peaks (e.g., a complex value for each of $P_0$, $P_1$, and $P_{-1}$). Therefore, the detection unit 120 may determine a phase of each of the peaks, and the output 122 may include the phases of each of the peaks.

In an additional or alternative embodiment, in addition to determining the peak data, the detection unit 120 may determine a preamble index associated with the signal. The detection unit 120 may determine the preamble index by combining the observed power of three cyclic shift windows (e.g., three detection zones) for each preamble index associated with the local Zadoff-Chu sequences to obtain a timing offset. The determined preamble index may be a particular preamble index having a same timing offset as the observed peaks. In an embodiment, each detection window may correspond to one of the observed peaks, as described in more detail with reference to FIG. 3. As shown in FIG. 1, the outputs 122 may be provided to the power comparison unit 150, the phase determination unit 160, and the CFO decision unit 170.

The database 140 may store information associated with a plurality of CFO candidates. For example, in an embodiment, the information associated with the plurality of CFO candidates may include, for each CFO candidate, theoretical peaks corresponding to a particular CFO estimate. For example, a particular entry of the database 140 may be associated with a particular CFO candidate, and may include information associated with a ratio of the squared power between each of the two side peaks (e.g., a left peak and a right peak) and a main peak associated with the particular CFO candidate, where the ratio of the squared power between the right peak and the main peak associated with the particular CFO candidate is denoted ($r_1$), and where the ratio of the squared power between the left peak and the main peak associated with the particular CFO candidate is denoted ($r_{-1}$). In an embodiment, $r_1$ and $r_{-1}$ may be given by:

$$r_1 = \left|\frac{P'_1}{P'_0}\right|^2; \quad \text{Equation 6}$$

and $$r_{-1} = \left|\frac{P'_{-1}}{P'_0}\right|^2. \quad \text{Equation 7}$$

In equations 6 and 7, $P'_0$ is a pre-determined magnitude of the main peak of the CFO candidate, $P'_1$ is a pre-determined magnitude of the right peak of the CFO candidate, and $P'_{-1}$ is a pre-determined magnitude of the left peak of the CFO candidate, where the CFO candidate is associated with a known CFO ($f_i$). In an embodiment, the peak data included in the output 122 may include a ratio of the squared power between each of the two side peaks ($P_1$ and $P_{-1}$) and the main peak ($P_0$) associated with the received signal, where the ratio of the squared power between the right peak ($P_1$) and the main peak ($P_0$) of the correlation output may be $$\left|\frac{P_1}{P_0}\right|^2,$$

and where the ratio of the squared power between the left peak ($P_{-1}$) and the main peak ($P_0$) of the correlation output may be $$\left|\frac{P_{-1}}{P_0}\right|^2.$$

The database 140 may provide CFO candidate data 142 (e.g., one or more CFO candidates) to the power comparison unit 150, and the power comparison unit 150 may compare the squared power ratios of the peaks associated with the received signal to the squared power ratios (e.g., $r_1$ and $r_{-1}$) for each of the CFO candidates included in the CFO candidate data 142 to determine a coarse CFO estimate ($|\Delta f_{coarse}|$) for the received signal. In an embodiment, the power comparison unit 150 may perform the comparison using a lookup table (e.g., the database 140 may be implemented as a lookup table). In an additional or alternative embodiment, the power comparison unit 150 perform the comparison using an objective function $g(f_i)$, where $g(f_i)$ may be given by:

$$g(f_i) = \left(\left|\frac{P_1}{P_0}\right|^2 - r_1(f_i)\right)^2 + \left(\left|\frac{P_{-1}}{P_0}\right|^2 - r_{-1}(f_i)\right)^2. \quad \text{Equation 8}$$

In equation 8, $P_1$ corresponds to a correlation output associated with the right peak, $P_0$ corresponds to a correlation output associated with the main peak, $P_{-1}$ corresponds to a correlation output associated with the left peak, $$\left|\frac{P_1}{P_0}\right|^2$$

is the ratio of the squared power between the right peak ($P_1$) and the main peak ($P_0$) of the correlation output, $$\left|\frac{P_{-1}}{P_0}\right|^2$$

is the ratio of the squared power between the left peak ($P_{-1}$) and the main peak ($P_0$) of the correlation output, $f_i$ corresponds to a known CFO associated with a particular CFO candidate of the plurality of CFO candidates, $r_1(f_i)$ corresponds to a pre-determined value representative of the squared power ratio between a right peak of the particular CFO candidate and a main peak of the particular CFO candidate, and $r_{-1}(f_i)$ corresponds to a pre-determined value representative of the squared power ratio between a left peak of the particular CFO candidate and the main peak of the particular CFO candidate. Additionally, in equation 8, $r_1(f_i)$ and $r_{-1}(f_i)$ may be given by:

$$r_1(f_i) = \left|\frac{P'_{1(f_i)}}{P'_0(f_i)}\right|^2; \quad \text{Equation 9}$$

and $$r_{-1}(f_i) = \left|\frac{P'_{-1}(f_i)}{P'_0(f_i)}\right|^2. \quad \text{Equation 10}$$

Thus, from equations 9 and 10 it can be seen that $r_1$ and $r_{-1}$ are representative of a squared power ratio between a right peak of a CFO candidate having a CFO ($f_i$) and a main peak of the CFO candidate, and a squared power ratio between the left peak of the CFO candidate and a main peak of the CFO candidate, respectively. In an embodiment, the power comparison unit 150 may determine the coarse CFO estimate as:

$$\Delta f_{coarse} = \arg\min_{f_i} g(f_i) \quad \text{Equation 11.}$$

In equation 11, $\arg\min_{f_i} g(f_i)$ may identify a candidate CFO estimate ($\Delta f_{coarse}$) having a closest distance to the squared power ratios of the peaks of the correlation output associated with the received signal. Stated another way, in equation 11, ($\Delta f_{coarse}$) may be set equal to a CFO candidate having squared power ratios that most closely match the squared power ratios of the correlation peaks associated with the received signal. Therefore, $\Delta f_{coarse}$ may closely approximate a CFO of the received signal as indicated by the power of the correlation peaks.

Figure 4:
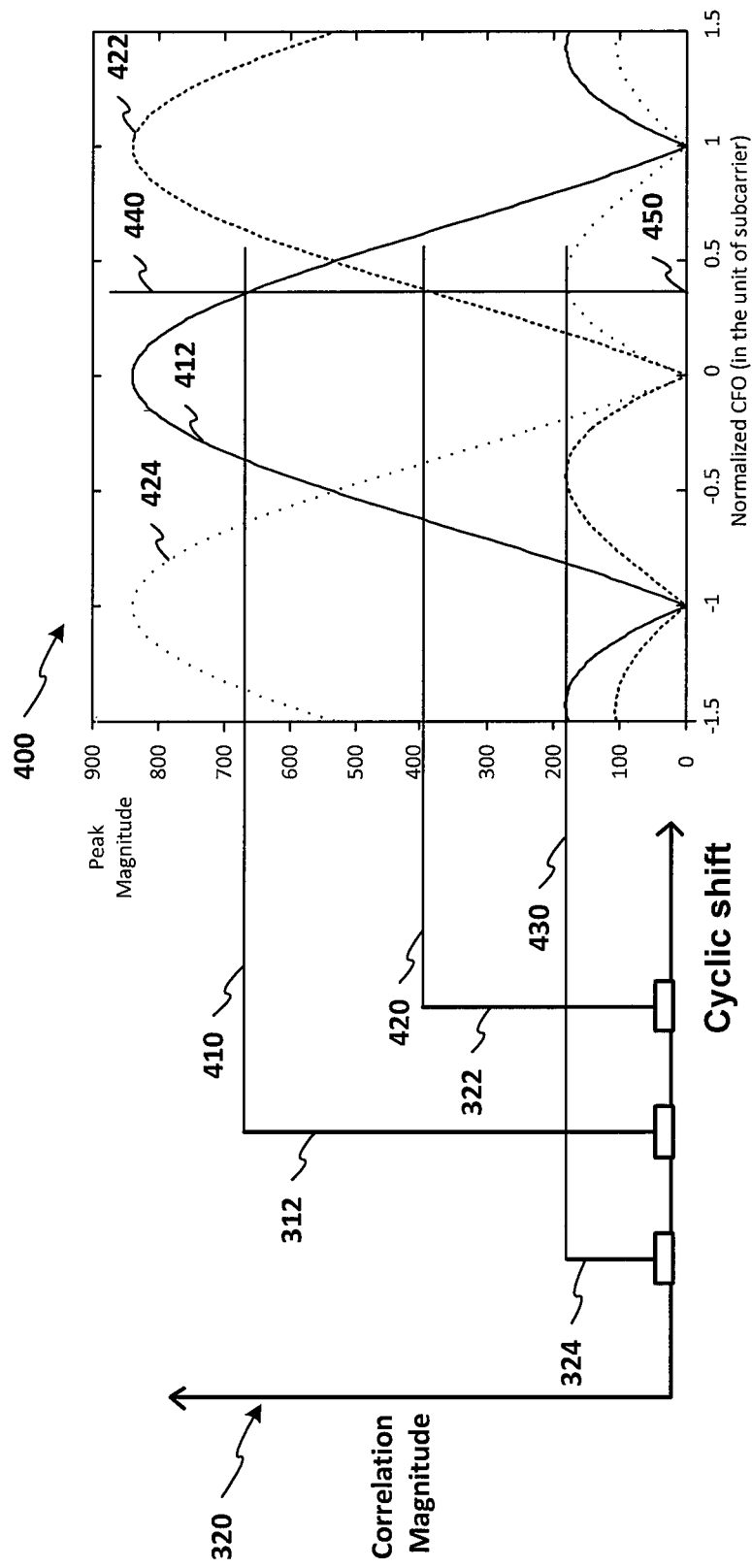
FIG. 4 is a diagram illustrating a mapping of observed correlation peak power to a carrier frequency offset (CFO)

The power comparison unit 150 may provide the coarse CFO estimate, shown in FIG. 1 as an output 152, to the CFO decision unit 170. Comparing the squared power ratios of the correlation peaks associated with the received signal and the squared power ratios associated with the CFO candidates to determine the coarse CFO estimate may provide a good initial estimate of the CFO of the received signal. For example, and referring to FIG. 4, a diagram illustrating a mapping of observed correlation peak power to a carrier frequency offset (CFO) is shown as a diagram 400. In FIG. 4, a diagram 400 and the second diagram 320 of FIG. 3 are shown. In the diagram 400, the y-axis corresponds to a magnitude of the correlator outputs (e.g., an amplitude of $P_0$, $P_1$, $P_{-1}$), and the x-axis corresponds to a normalized CFO in units of sub-carrier. In the diagram 400, a first plot 412, a second plot 422, and a third plot 424 are shown. The first plot 412 may be representative of a relationship between the normalized CFO and the magnitude of the main peak ($P_0$)

312, the second plot 422 may be representative of a relationship between the normalized CFO and the magnitude of the right peak ($P_1$) 322, and the third plot 424 may be representative of a relationship between the normalized CFO and the magnitude of the left peak ($P_{-1}$) 322.

In the diagram 400, it is shown that a CFO estimate 450 may be mapped to the magnitude (e.g., the power) of the correlation peaks ($P_0$, $P_1$, $P_{-1}$) by determining a CFO having a coordinate in the x-axis of the diagram 400 that intersects each of the plots 412, 422, 424 at a position (e.g., a position on the y-axis) corresponding to the magnitude of the respective peaks, as indicated by the line 440. For example, the lines 410, 420, 430 illustrate the respective magnitudes of the peaks 312, 322, 324. As can be seen in FIG. 4, the line 440 intersects each of the plots 412, 422, 424 at the respective magnitudes of the peaks 312, 322, 324. Thus, when the CFO of the received signal corresponds to the CFO estimate 450, the respective magnitudes of the peaks 312, 322, 324 should correspond to the intersection of the line 440 with the lines 410, 420, 430, respectively.

Referring back to FIG. 1, it is noted that using a lookup table to compare the squared power ratios associated with the correlation peaks and the squared power ratios associated with the CFO candidates to determine the coarse CFO estimate may simplify the calculation of the coarse CFO estimate, thereby reducing a computational complexity required obtain the coarse CFO estimate as compared to other CFO estimation techniques based on relative power ratios. Furthermore, because the squared power ratios of the correlation peaks associated with the received signal may be mapped to the CFO, as described with reference to FIG. 4, the coarse CFO estimate determined based on the comparison of the squared power ratios of the correlation peaks associated with the received signal and the squared power ratios associated with the CFO candidates may provide a good approximation of the CFO of the received signal. However, the squared power ratios of the correlation peaks associated with the received signal may be similar for different CFO candidates in some CFO regions (e.g., $|\Delta f|<500$ Hz, etc.), which may lead to incorrect CFO determinations.

Figure 5:
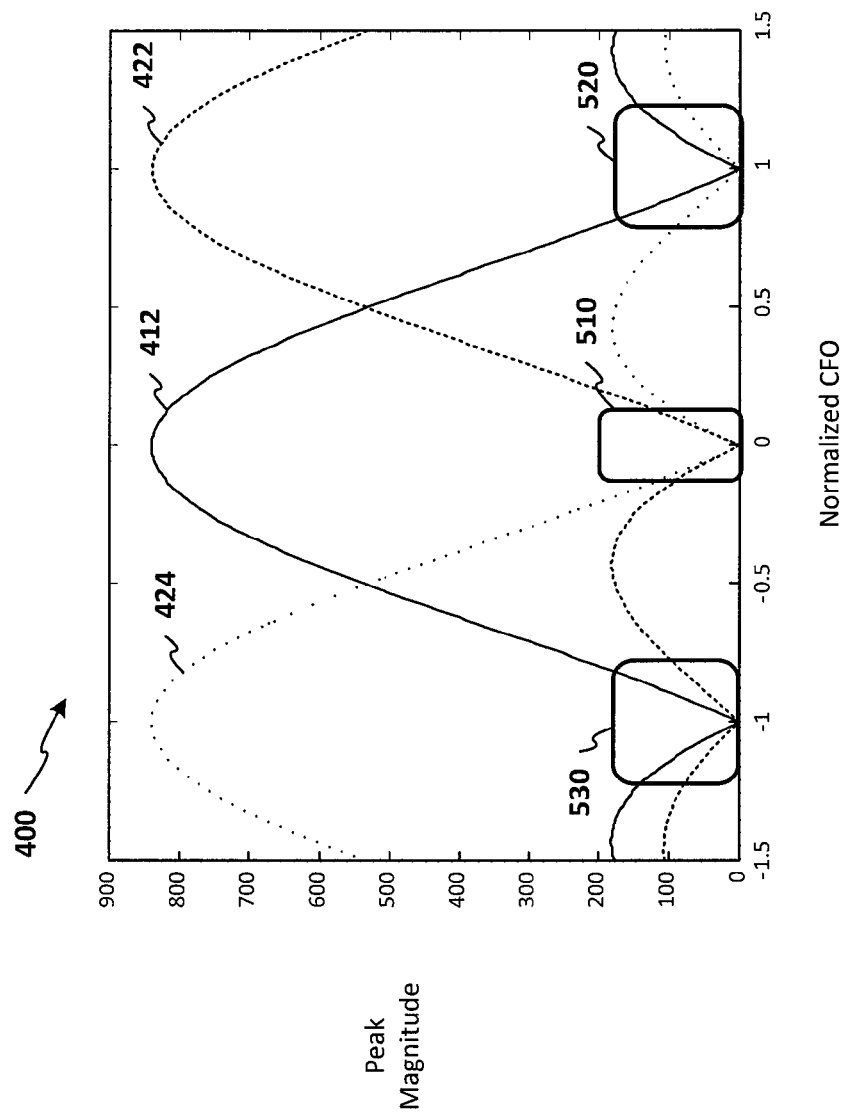
FIG. 5 is a diagram illustrating ambiguity zones associated with estimating carrier frequency offset (CFO) using relative power of observed correlation peaks.

To illustrate, and referring to FIG. 5, a diagram illustrating ambiguity zones associated with estimating carrier frequency offset (CFO) using relative power of correlation peaks associated with a received signal is shown. In FIG. 5, the diagram 400 of FIG. 4 is shown, and a plurality of zones of ambiguity are shown and include a first zone of ambiguity 510, a second zone of ambiguity 520, and a third zone of ambiguity 530 are shown. The first zone of ambiguity 510 may make it difficult to estimate the CFO when normalized CFO is small (e.g., $|\Delta f|<500$ Hz). For example, in the first zone of ambiguity 510, the peak magnitude associated with the left peak ($P_{-1}$) and the right peak ($P_1$) (e.g., the plots 424 and 422 of FIG. 4, respectively) may be similar, which may result in an incorrect determination of the sign of the CFO (e.g., is the CFO positive or negative, or on the left or right side of 0). Ambiguity within the first zone of ambiguity 510 may also occur when a signal-to-noise ratio (SNR) associated with the received signal is low. Additionally or alternatively, the ambiguity may occur within the second zone of ambiguity 520 and/or the third zone of ambiguity 530 when the magnitude of the two side peaks and the main peak is similar on both the left and right sides of the sub-carrier spacing when the normalized CFO is near +/−1 (e.g., 1000 Hz<$|\Delta f|$<1500 Hz). The ambiguities described above may cause an incorrect CFO estimation even when the CFO estimation is based on a signal received via the PRACH.

Thus, determining CFO estimates based solely on the relationship of magnitude of the peaks (e.g., the peaks 312, 322, 324 of FIG. 3) may result in an incorrect CFO estimate, even when the CFO estimate is determined based on a signal received via the PRACH. A CFO estimation unit (e.g., the CFO estimation unit 130 of FIG. 1) of embodiments may be operable to resolve the ambiguity associated with the correct region of the CFO prior to determining the CFO estimate, thereby increasing the accuracy of the estimated CFO. In an embodiment, the CFO estimation unit 130 of embodiments may resolve the ambiguity based on a phase of the left peak ($P_{-1}$), a phase of the right peak ($P_1$), and a phase of the main peak ($P_0$), as described in more detail below.

Figure 6:
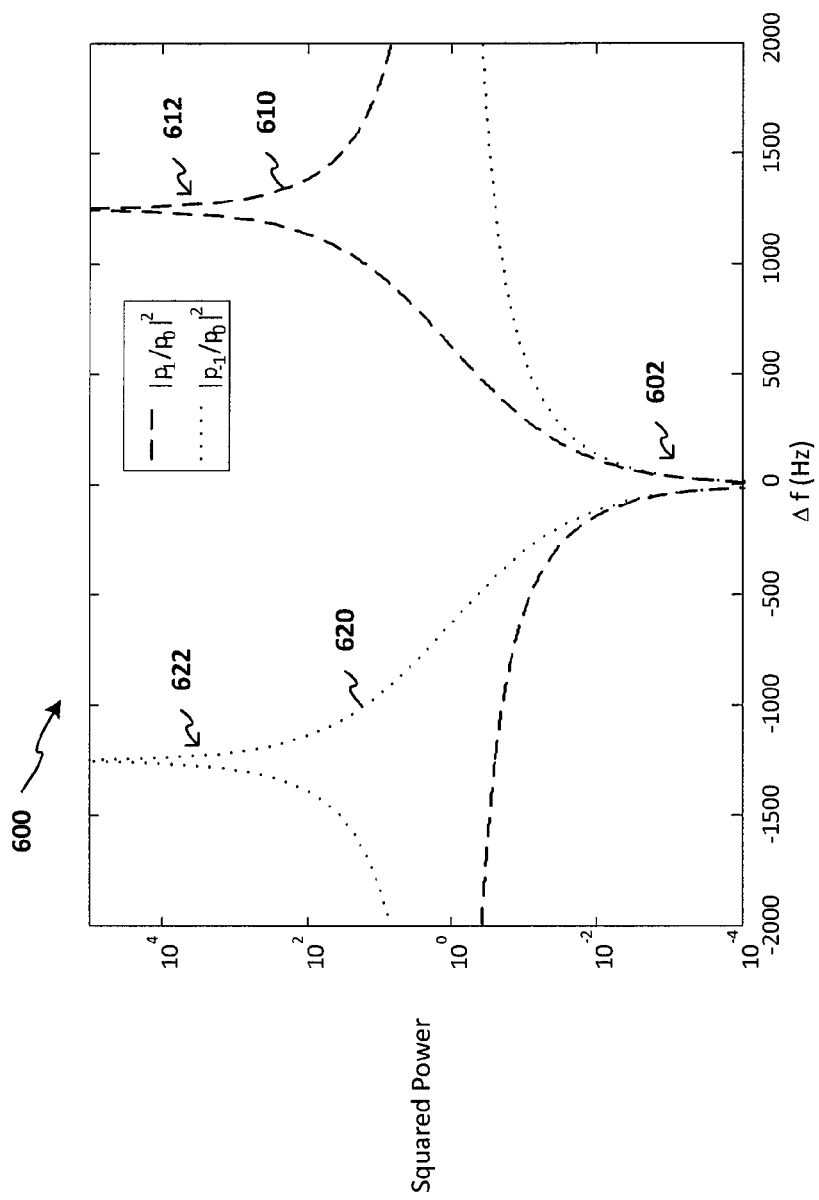
FIG. 6 is a diagram illustrating squared power ratios of correlation peaks associated with a received signal.

To further illustrate how ambiguities may cause inaccuracies in CFO estimates, and with reference to FIG. 6, a diagram illustrating squared power ratios of correlation peaks associated with a received signal is shown as a diagram 600. In the diagram 600, a first plot 610 and a second plot 620 are shown. The first plot 610 may be associated with a squared power ratio between a right peak ($P_1$) and a main peak ($P_0$), the second plot 620 may be associated with a squared power ratio between a left peak ($P_{-1}$) and the main peak ($P_0$). As can be seen in the diagram 600, zones of ambiguity 612 or 622 may exist where the squared power ratios associated with the left or right peaks may have approximately the same relative power on both sides of the normalized CFO=+/−1, respectively. Additionally, a zone of ambiguity 602 may also be seen for small CFO, where the squared power ratios of the left and right peaks may be approximately the same. Comparing the zones of ambiguity 602, 612, 622 illustrated in the diagram 600 to the zones of ambiguity 510, 520, 530 of FIG. 5, it can be seen that utilizing the power (e.g., magnitude) of the correlation peaks alone may be insufficient to accurately determine a CFO estimate for various CFO values. In particular, the zones of ambiguity 602, 612, 622 of FIG. 6 and the zones of ambiguity 510, 520, 530 of FIG. 5 illustrate that using only squared power ratios and other power related parameters to determine CFO estimates in conditions that are common to HST scenarios (e.g., CFOs of approximately +/−1340 Hz and CFOs determined under low signal-to-noise ratio (SNR) conditions) may cause inaccurate CFO estimates, which may degrade the performance of a system in communication with a wireless device (e.g., a cellular voice and/or data network). The present disclosure includes systems, methods, apparatus, and computer-readable storage media to more accurately estimate CFO by using phases of the peaks to resolve the ambiguities described above with reference to FIGS. 5 and 6, as described in more detail below.

Referring back to FIG. 1, the power comparison unit 150 may provide the coarse CFO estimate to the CFO decision unit 170 (e.g., as the output 152). The CFO decision unit 170 may determine a final CFO estimate 172 based on the coarse CFO estimate and phases of the respective peaks of the correlation output, as described in more detail below. As shown in FIG. 1, the phase determination unit 160 may receive the output 122 from the detection unit 120, and may be configured to determine theoretical values (or phases) of the peaks associated with the received signal based on the output 122. For example, in an embodiment, the phase determination unit 160 may determine the theoretical values (or phases) of the peaks based on the preamble index included in the output 122. In an embodiment, the theoretical values (or phases) associated with the peaks may include a theoretical value $\alpha_1$ associated with the right peak, and may include a theoretical value $\alpha_{-1}$ associated with the left peak. In an embodiment, the phase determination 160 may determine the theoretical phase difference between the right peak and the main peak, $\alpha_1$, and the theoretical phase difference between the left peak and the main peak, $\alpha_{-1}$ using a lookup table given by:

$$\alpha = \begin{bmatrix} \angle\left(\frac{P_1}{P_0}\right)\bigg|(0<\Delta f<\Delta F) & \angle\left(\frac{P_{-1}}{P_0}\right)\bigg|(0<\Delta f<\Delta F) \\ \angle\left(\frac{P_1}{P_0}\right)\bigg|(-\Delta F<\Delta f<0) & \angle\left(\frac{P_{-1}}{P_0}\right)\bigg|(-\Delta F<\Delta f<0) \end{bmatrix},$$

where $\Delta F$ is the sub-carrier spacing, $\Delta f$ is a known CFO, $$\angle\left(\frac{P_1}{P_0}\right)(0<\Delta f<\Delta F)$$

is a first phase difference between the right peak and the main peak when $$(0<\Delta f<\Delta F), \angle\left(\frac{P_1}{P_0}\right)(-\Delta F<\Delta f<0)$$

is a second phase difference between the right peak and the main peak when $$(-\Delta F<\Delta f<0), \angle\left(\frac{P_{-1}}{P_0}\right)(0<\Delta f<\Delta F)$$

is a first phase difference between the left peak and the main peak when $$(0<\Delta f<\Delta F),$$

and $$\angle\left(\frac{P_{-1}}{P_0}\right)(-\Delta F<\Delta f<0)$$

is a second phase difference between the left peak and the main peak when ($-\Delta F<\Delta f<0$) which may be obtained from equation 4, and may be generated based on predetermined CFO values.

Figure 7:
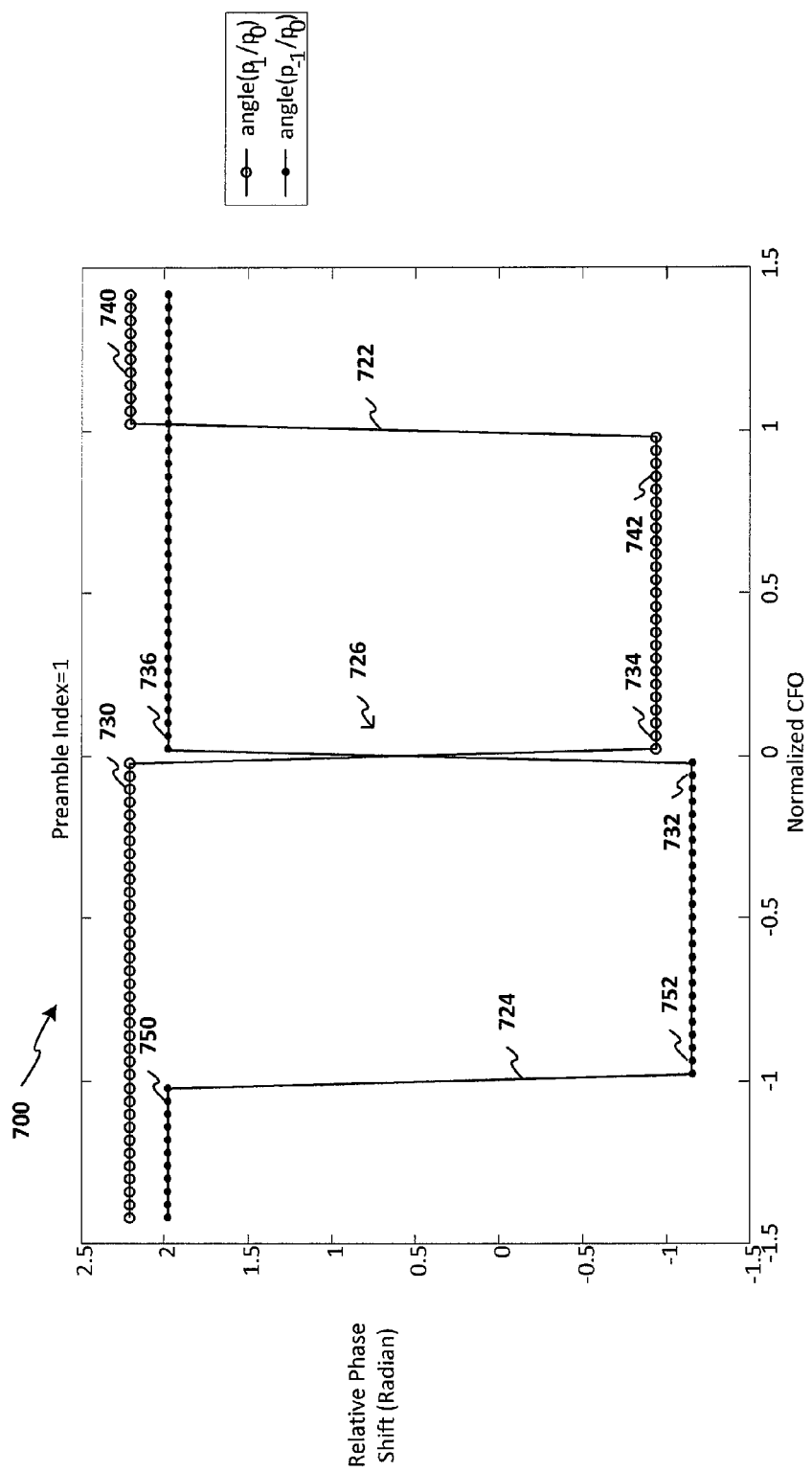
FIG. 7 is a plot illustrating pre-determined theoretical values associated with a known preamble index according to embodiments.

For example, and referring to FIG. 7, a plot illustrating pre-determined theoretical values associated with a known preamble index according to embodiments is shown as a plot 700. As shown in FIG. 7, the plot 700 includes a first plot 722 associated with a theoretical angle of the right correlation peak, and a second plot 724 associated with a theoretical angle of the left correlation peak. It can be seen in FIG. 7 that, in the regions near subcarrier spacing (e.g., at the regions where the normalized CFO=+/−1), the angle corresponding to the stronger side peak may have a 180° phase shift when the CFO crosses the subcarrier spacing. For example, the first plot 722 demonstrates a 180° phase shift when the normalized CFO=+1, as indicated by the theoretical values 740 and 742, and the second plot 724 demonstrates a 180° phase shift when the normalized CFO=−1, as indicated by the theoretical values 750 and 752.

In an embodiment, for the CFO region surrounding normalized CFO=+1 (e.g., +1000 Hz<CFO<+1500 Hz) the distance between theoretical value 742 and the phase difference between the right correlation peak and the main correlation peak may be represented by $$\delta_1 = [\angle\left(\frac{P_1}{P_0}\right) - \alpha_1(0<\Delta f<(\Delta F)]^2,$$

and the distance between theoretical value 740 and the phase difference between the right correlation peak and the main correlation peak may be represented as $$\delta_2 = \left[\angle\left(\frac{P_1}{P_0}\right) - \alpha_1(\Delta f>\Delta F)\right]^2,$$

where $\alpha_1$ is determined from the $\alpha$ (described above) and corresponds to the theoretical value 742 when the received signal (or the Zadoff-Chu sequence associated with the received signal) is associated with a particular preamble index and $0<\Delta f<\Delta F$, where $\alpha_1$ corresponds to the theoretical value 740 when the received signal (or the Zadoff-Chu sequence associated with the received signal) is associated with the particular preamble index and $$\Delta f > \Delta F, \angle\left(\frac{P_1}{P_0}\right)$$

is the phase difference between the right correlation peak and the main correlation peak, $\Delta f$ is the CFO estimate, and $\Delta F$ is the sub-carrier spacing. In an embodiment, the CFO (or normalized CFO) may be around +1 when the sub-carrier spacing is 1250 Hz and the CFO is between 1000 Hz and 1500 Hz.

In an embodiment, for the CFO region surrounding normalized CFO=−1 (e.g., −1500 Hz<CFO <−1000 Hz) the distance between theoretical value 750 and the phase difference between the left correlation peak and the main correlation peak may be represented by $$\delta_1 = [\angle\left(\frac{P_{-1}}{P_0}\right) - \alpha_{-1}(\Delta f<(-\Delta F)]^2,$$

and the distance between theoretical value 752 and the difference between the left correlation peak and the main correlation peak may be represented as $$\delta_2 = \left[\angle\left(\frac{P_{-1}}{P_0}\right) - \alpha_{-1}((-\Delta F)<\Delta f<0)\right]^2,$$

where $\alpha_{-1}$ is determined from the $\alpha$ (described above) and corresponds to the theoretical value 750 when the received signal (or the Zadoff-Chu sequence associated with the received signal) is associated with a particular preamble index and $\Delta f<(-\Delta F)$, and where $\alpha_{-1}$ corresponds to the theoretical value 752 when the received signal (or the Zadoff-Chu sequence associated with the received signal) is associated with the particular preamble index and $(-\Delta F) < \Delta f < 0$, where $$\angle\left(\frac{P_{-1}}{P_0}\right)$$

is the phase difference between the left correlation peak and the main correlation peak, $\Delta f$ is the CFO estimate, and $\Delta F$ is the sub-carrier spacing. In an embodiment, the CFO (or normalized CFO) may be around −1 when the sub-carrier spacing is 1250 Hz and the CFO is between −1500 Hz and −1000 Hz.

Additionally, it can be seen in FIG. 7, at 726, that, in the small CFO region (e.g., the region surrounding normalized CFO=0 or |CFO|<500 Hz) that both the first plot 722 and the second plot 724 demonstrate a 180° phase shift when the phase crosses normalized CFO=0, as indicated for the first plot 722 by the theoretical values 730 and 734, and as indicated for the second plot 724 by the theoretical values 732 and 736. In an embodiment, for the small CFO region, the distance between theoretical values 734 and 736 and those of the correlation output may be represented by $$\delta_1 = \left[\angle\left(\frac{P_1}{P_0}\right) - a_1(0 < \Delta f < \Delta F)\right]^2 + \left[\angle\left(\frac{P_{-1}}{P_0}\right) - a_{-1}(0 < \Delta f < \Delta F)\right]^2,$$

where $\delta_1$ is representative of the sum of a distance between the theoretical value 734 and the phase difference between the right correlation peak and the main correlation peak when $0<\Delta f<\Delta F$ and a distance between the theoretical value 736 and the phase difference between the left correlation peak and the main correlation peak when $0<\Delta f<\Delta F$, where $\Delta F$ is the sub-carrier spacing, $$\angle\left(\frac{P_1}{P_0}\right)$$

is the phase difference between the right correlation peak and the main peak, $$\angle\left(\frac{P_{-1}}{P_0}\right)$$

is the phase difference between the left correlation peak and the main peak, $\alpha_1$ $(0<\Delta f<\Delta F)$ is the theoretical value 734 when the received signal (or the Zadoff-Chu sequence associated with the received signal) is associated with a particular preamble index of the Zadoff-Chu sequence and $0<\Delta f<\Delta F$, wherein $\alpha_{-1}$ $(0<\Delta f<\Delta F)$ is the theoretical value 736 when the received signal (or the Zadoff-Chu sequence associated with the received signal) is associated with the particular preamble index of the Zadoff-Chu sequence and $0<\Delta f<\Delta F$, $\Delta f$ is the CFO estimate, where $$\left[\angle\left(\frac{P_1}{P_0}\right) - a_1(0 < \Delta f < \Delta F)\right]^2$$

represents the distance between the theoretical value 734 and the phase difference between the right correlation peak and the main correlation peak, and $$\left[\angle\left(\frac{P_{-1}}{P_0}\right) - a_{-1}(0 < \Delta f < \Delta F)\right]^2$$

represents the distance between the theoretical value 736 and the phase difference between the left correlation peak and the main correlation peak. Additionally, in the small CFO region, the distance between theoretical values 730 and 732 and those of the correlation output may be represented as $$\delta_2 = \left[\angle\left(\frac{P_1}{P_0}\right) - a_1(-\Delta F < \Delta f < 0)\right]^2 + \left[\angle\left(\frac{P_{-1}}{P_0}\right) - a_{-1}(-\Delta F < \Delta f < 0)\right]^2,$$

where $\delta_2$ is representative of the sum of a distance between the theoretical value 730 and the phase difference between the right correlation peak and the main correlation peak when $-\Delta F<\Delta f<0$ and a distance between the theoretical value 732 and the phase difference between the left correlation peak and the main correlation peak when $-\Delta F<\Delta f<0$, where $\Delta F$ is the sub-carrier spacing, $$\angle\left(\frac{P_1}{P_0}\right)$$

is the phase difference between the right correlation peak and the main peak, $$\angle\left(\frac{P_{-1}}{P_0}\right)$$

is the phase difference between the left correlation peak and the main peak, where $\alpha_1$ $(-\Delta F<\Delta f<0)$ is the theoretical value 730 when the received signal (or the Zadoff-Chu sequence associated with the received signal) is associated with the particular preamble index of the Zadoff-Chu sequence and $(-\Delta F<\Delta f<0)$, wherein $\alpha_{-1}$ $(-\Delta F<\Delta f<0)$ is the theoretical value 732 when the received signal (or the Zadoff-Chu sequence associated with the received signal) is associated with the particular preamble index of the Zadoff-Chu sequence and $-\Delta F<\Delta f<0$, where $\Delta f$ is the CFO estimate where $$\left[\angle\left(\frac{P_1}{P_0}\right) - a_1(-\Delta F < \Delta f < 0)\right]$$

represents the distance between theoretical value 732 and phase difference between the right correlation peak and the main correlation peak, and $$\left[\angle\left(\frac{P_{-1}}{P_0}\right) - a_{-1}(-\Delta F < \Delta f < 0)\right]^2$$

represents the distance between theoretical value 732 and that the phase difference between the left correlation peak and the main correlation peak, and where $\alpha_1$ and $\alpha_{-1}$ are determined from the $\alpha$ (described above), $$\angle\left(\frac{P_1}{P_0}\right)$$

is the phase difference between the right correlation peak and the main correlation peak, $$\angle\left(\frac{P_{-1}}{P_0}\right)$$

is the phase difference between the left correlation peak and the main correlation peak, Δf is the CFO estimate, and ΔF is the sub-carrier spacing. In an embodiment, the CFO (or normalized CFO) may be around 0 when the sub-carrier spacing is 1250 Hz and the CFO is between −500 Hz and 500 Hz.

A CFO estimation unit (e.g., the CFO estimation unit 130 of FIG. 1) of embodiments may use the relationships described above to determine a region associated with the CFO, as described in more detail below.

Referring back to FIG. 1, the phase determination unit 160 may generate an output 162 including information associated with the theoretical phase (or angle) differences between the left peak and the main peak and between the right peak and the main peak. The CFO decision unit 170 may be adapted to determine the final CFO estimate based on the coarse CFO estimate and phase information (e.g., the theoretical phases and phases of the peaks associated with the received signal). Using the phase information to determine the final CFO estimate may resolve the ambiguities that arise when only relative power values are used to determine the CFO estimate, as described in more detail below.

The CFO decision unit 170 may determine a CFO region associated with the received signal. For example, the CFO decision unit may determine whether the CFO of the received signal is on the positive side of the sub-carrier spacing or the negative side of the sub-carrier spacing. In an embodiment, the CFO region may be determined based on the power comparison results (e.g., g(f_i) of equation 8) and the phases of the correlation peaks, which may utilize the predetermined values associated with the detected preamble index. In an embodiment, the predetermined values associated with the detected preamble index may be included in the output 162.

In an embodiment, the CFO decision unit 170 may determine the CFO region associated with the received signal based further on the coarse estimate included in the output 152, and may use the phase information to determine a final CFO estimate. For example, when the coarse estimate $|\Delta f_{coarse}|<500$ Hz, the CFO decision unit 170 may calculate:

$$\sigma = \left\|\begin{bmatrix} \angle\left(\frac{P_1}{P_0}\right) & \angle\left(\frac{P_{-1}}{P_0}\right) \\ \angle\left(\frac{P_1}{P_0}\right) & \angle\left(\frac{P_{-1}}{P_0}\right) \end{bmatrix} - \alpha\right\|. \quad \text{Equation 12}$$

In equation 12, $$\angle\left(\frac{P_1}{P_0}\right)$$

is the phase (or angle) difference between the right peak and the main peak, $$\angle\left(\frac{P_{-1}}{P_0}\right)$$

is the phase (or angle) difference between the left peak and the main peak, α corresponds to the predetermined values received from phase determination unit 160, and where σ is the absolute difference between the predetermined values and that of the correlation output. In an embodiment, after calculating σ, the CFO decision unit 170 may determine whether any value of σ is larger than π. If any value of a is larger than π, the CFO decision unit 170 may replace that value with 2π—itself. The CFO decision unit 170 may resolve the ambiguity of the CFO by determining a sign of the CFO based on the values of σ.

To illustrate, let $\delta_1 = \sigma_{1,1}^2 + \sigma_{1,2}^2$ and let $\delta_2 = \sigma_{2,1}^2 + \sigma_{2,2}^2$, where $\sigma_{i,j}^2$ is the entry in the i-th row and j-th column of σ, and where $\delta_1$ and $\delta_2$ are the squared distances associated with the positive and negative regions, respectively. The CFO decision unit 170 may then evaluate whether $\delta_1 < \delta_2$ to determine the region (e.g., the sign) of the CFO. For example, the CFO decision unit 170 may determine the final CFO Δf according to:

$$\Delta f = \begin{cases} |\Delta f_{coarse}| & \text{if } \delta_1 < \delta_2; \text{ and} \\ -|\Delta f_{coarse}| & \text{otherwise.} \end{cases} \quad \text{Equation 13}$$

Thus, it can be seen from equation 13 that, when $\delta_1 < \delta_2$, the sign of the final CFO estimate (Δf) is positive, otherwise the sign of the final CFO estimate (Δf) is negative. Thus, it has been shown that the CFO decision unit 170 of embodiments may resolve an ambiguity (e.g., the zone of ambiguity 510 of FIG. 5) for small CFO (e.g., |Δf|<500 Hz) using the phase information associated with the plurality of correlation peaks.

As an additional example, when 1000 Hz<$\Delta f_{coarse}$<1500 Hz, the CFO decision unit 170 may calculate:

$$\sigma = \left\|\begin{bmatrix} \angle\left(\frac{P_1}{P_0}\right) \\ \angle\left(\frac{P_1}{P_0}\right) \end{bmatrix} - \alpha(:,1)\right\|. \quad \text{Equation 14}$$

In equation 14, $$\angle\left(\frac{P_1}{P_0}\right)$$

is the phase difference between the right peak and the main peak, α corresponds to the predetermined values received from phase determination unit 160, α(:,1) is the first column of α, and where σ is the difference between the predetermined values and that of the correlation output. In an embodiment, after calculating σ, the CFO decision unit 170 may determine whether any value of σ is larger than π. If any value of σ is larger than π, the CFO decision unit 170 may replace that value with 2π—itself. The CFO decision unit 170 may resolve the ambiguity of the CFO by determining which side of positive subcarrier spacing (i.e., 1250 Hz) the CFO is on based on the values of σ.

To illustrate, let $$\delta_1 = \left[\angle\left(\frac{P_1}{P_0}\right) - \alpha_1(0 < \Delta f < \Delta F)\right]^2$$

and let $\delta_2 = \left[\angle\left(\frac{P_1}{P_0}\right) - \alpha_1(\Delta f > \Delta F)\right]^2$, where $\delta_1$ is a distance between the phase difference between the right correlation peak and the main correlation peak and a first theoretical value when $0<\Delta f<\Delta F$, where $\delta_2$ is a distance between the phase difference between the right correlation peak and the main correlation peak and a second theoretical value when $\Delta f>\Delta F$, wherein $P_1$ is the right correlation peak, wherein $P_0$ is the main correlation peak, where $\alpha_1$ is the first theoretical value when $0<\Delta f<\Delta F$, wherein $\alpha_1$ is the second theoretical value when $\Delta f>\Delta F$, where $$\angle\left(\frac{P_1}{P_0}\right)$$

is the phase difference between the right correlation peak and the main correlation peak associated with the signal. The CFO decision unit 170 may then evaluate whether $\delta_1<\delta_2$ to determine the region of the CFO, where $\delta_1<\delta_2$ indicates whether the phase of the phase difference between the right correlation peak and the main correlation peak is closer to the expected value of the left side (e.g., a CFO region on the negative side) of the sub-carrier spacing or the right side (e.g., a CFO region on the positive side) of the sub-carrier spacing. For example, when $\delta_1<\delta_2$, the distance between the phase difference between the right correlation peak and the main correlation peak and the first theoretical value may be closer than the distance from the phase difference between the right correlation peak and the main correlation peak and the second theoretical value. Because $\delta_1$ is associated with $0<\Delta f<\Delta F$, the CFO decision unit 170 may determine that the CFO is on the left side of $\Delta F$, thereby eliminating potential ambiguity in the final CFO estimate. Thus, evaluating $\delta_1<\delta_2$ may facilitate the determination of a range of the CFO, which may be used to determine the final CFO estimate. For example, the CFO decision unit 170 may determine the final CFO $\Delta f$ according to:

Equation 15

$$\Delta f = \begin{cases} \operatorname{argmin}_{f_i<\Delta F}\left(\left|\frac{P_1}{P_0}\right|^2 - r_1(f_i)\right)^2 + \left(\left|\frac{P_{-1}}{P_0}\right|^2 - r_{-1}(f_i)\right)^2, & \text{if } \delta_1 < \delta_2 \\ \operatorname{argmin}_{f_i>\Delta F}\left(\left|\frac{P_1}{P_0}\right|^2 - r_1(f_i)\right)^2 + \left(\left|\frac{P_{-1}}{P_0}\right|^2 - r_{-1}(f_i)\right)^2, & \text{otherwise} \end{cases}.$$

In equation 15, $\Delta f$ is the final CFO estimate, $f_i$ corresponds to a known CFO associated with a particular CFO candidate of the plurality of CFO candidates, $$\left|\frac{P_1}{P_0}\right|^2$$

is a squared power ratio between the right peak of the correlation output and the main peak of the correlation output, $$\left|\frac{P_{-1}}{P_0}\right|^2$$

is a squared power ratio between the left peak of the correlation output and the main peak of the correlation output, $r_1(f_i)$ is the squared power ratio between a right peak of the particular CFO candidate and a main peak of the particular CFO candidate, and $r_{-1}(f_i)$ is the squared power ratio between a left peak of the particular CFO candidate and the main peak of the particular CFO candidate, where the particular CFO candidate is associated with the coarse CFO. Thus, it can be seen from equations 14 and 15 that the accuracy of the final CFO estimate ($\Delta f$) may be improved by using the phase of the correlation peaks to determine the final CFO estimate.

From equations 14 and 15 it can be seen that the CFO decision unit 170 of embodiments may resolve an ambiguity (e.g., the zone of ambiguity 520 of FIG. 5) associated with a CFO estimate using the phase of the correlation peaks. Thus, the CFO decision unit 170 of embodiments may resolve an ambiguity (e.g., the second zone of ambiguity 520 of FIG. 5) associated with a CFO estimate, thereby increasing the accuracy of the final CFO estimate.

In an embodiment, equation 15 may be solved and the final CFO estimate may be given by:

$$\Delta f = \begin{cases} \operatorname{argmin}_{f_i<\Delta F} g(f_i) & \text{if } \delta_1 < \delta_2; \text{ and} \\ \operatorname{argmin}_{f_i>\Delta F} g(f_i) & \text{otherwise} \end{cases}.$$

Equation 16

As yet another additional example, when $-1500\text{ Hz}<\Delta f_{coarse}<-1000\text{ Hz}$, the CFO decision unit 170 may calculate:

$$\sigma = \left|\begin{bmatrix} \angle\left(\frac{P_{-1}}{P_0}\right) \\ \angle\left(\frac{P_{-1}}{P_0}\right) \end{bmatrix} - \alpha(:,2)\right|.$$

Equation 17

In equation 17, $$\angle\left(\frac{P_{-1}}{P_0}\right)$$

is the phase difference between the left peak and the main peak, α corresponds to the predetermined values received from phase determination unit 160, $\alpha(:,2)$ is the second column of α, and where σ is the difference between the predetermined values and that of the correlation output. In an embodiment, after calculating σ, the CFO decision unit 170 may determine whether any value of σ is larger than π. If any value of σ is larger than π, the CFO decision unit 170 may replace that value with 2π—itself. The CFO decision unit 170 may resolve the ambiguity of the CFO by determining which side of negative subcarrier spacing (i.e., −1250 Hz) the CFO is on based on the values of σ.

To illustrate, let $$\delta_1 = \left[\angle\left(\frac{P_{-1}}{P_0}\right) - \alpha_{-1}(\Delta f < (-\Delta F)\right]^2$$

and let $\delta_2 = \left[\angle\left(\frac{P_{-1}}{P_0}\right) - \alpha_{-1}((-\Delta F) < \Delta f < 0)\right]^2$, as described above. The CFO decision unit 170 may then evaluate whether $\delta_1 < \delta_2$ to determine the region of the CFO. For example, the CFO decision unit 170 may determine the final CFO $\Delta f$ according to:

Equation 18

$$\Delta f = \begin{cases} \operatorname{argmin}_{f_i < (-\Delta F)}\left(\left|\frac{P_1}{P_0}\right|^2 - r_1(f_i)\right)^2 + \left(\left|\frac{P_{-1}}{P_0}\right|^2 - r_{-1}(f_i)\right)^2, & \text{if } \delta_1 < \delta_2; \text{ and} \\ \operatorname{argmin}_{f_i > (-\Delta F)}\left(\left|\frac{P_1}{P_0}\right|^2 - r_1(f_i)\right)^2 + \left(\left|\frac{P_{-1}}{P_0}\right|^2 - r_{-1}(f_i)\right)^2 & \text{otherwise} \end{cases}$$

In equation 18, $\Delta f$ is the final CFO estimate, $f_i$ corresponds to a known CFO associated with a particular CFO candidate of the plurality of CFO candidates, $$\left|\frac{P_1}{P_0}\right|^2$$

is a squared power ratio between the right correlation peak associated with the received signal and the main correlation peak associated with the received signal, $$\left|\frac{P_{-1}}{P_0}\right|^2$$

is a squared power ratio between the left correlation peak associated with the received signal and the main correlation peak associated with the received signal, $r_1(f_i)$ is the squared power ratio between a right peak of the particular CFO candidate and a main peak of the particular CFO candidate, and $r_{-1}(f_i)$ is the squared power ratio between a left peak of the particular CFO candidate and the main peak of the particular CFO candidate, where the particular CFO candidate is associated with the coarse CFO.

From equations 17 and 18 it can be seen that the accuracy of the final CFO estimate ($\Delta f$) may be improved by using the phase of the correlation peaks to determine the final CFO estimate. Thus, the CFO decision unit 170 of embodiments may resolve an ambiguity (e.g., the third zone of ambiguity 530 of FIG. 5) associated with a CFO estimate, thereby increasing the accuracy of the final CFO estimate.

In an embodiment, equation 18 may be solved and the final CFO estimate may be given by:

$$\Delta f = \begin{cases} \operatorname{argmin}_{f_i < (\Delta F)} g(f_i) & \text{if } \delta_1 < \delta_2; \text{ and} \\ \operatorname{argmin}_{f_i > (-\Delta F)} g(f_i) & \text{otherwise} \end{cases}$$

Equation 19

In equation 19, $g(f_i)$ is obtained from equation 8, $f_i$ corresponds to a known CFO associated with a particular CFO candidate of the plurality of CFO candidates, and $\Delta f$ is the final CFO estimate.

Thus, it has been shown that the system 100 of embodiments, and in particular the transceiver 104 of embodiments, may determine a final CFO estimate with an increased accuracy. For example, by using the phase of the plurality of correlation peaks, as described above, the CFO estimation unit 130 of embodiments may eliminate potential ambiguities that may result in an incorrect determination of the CFO, which may provide an advantage over systems that determine CFO estimates based only on power levels of the plurality of peaks, as explained above with reference to at least FIGS. 2 and 4-6. Further, advantages and illustrations of the benefits of determining a final CFO estimate according to embodiments are described below with reference to FIGS. 8A-13B.

It is noted that although described in FIG. 1 with reference to determining CFO estimates for signals received via PRACH, where the signals are associated with a Zadoff-Chu sequence, the present disclosure is not intended to be limited to such signals, as the embodiments may be readily applied to other signals and transmission channels exhibiting characteristics similar to the characteristics of the signals transmitted and received via PRACH, such as exhibiting a plurality of correlation peaks when correlating the received signal with a known sequence, and exhibiting phase shift of the plurality of correlation peaks at the zones of ambiguity described with reference to FIGS. 5 and 6, and the like. Further, embodiments may also be applied to signals received on signals other than PRACH, such as signals received on other channels on which signals utilizing use Zadoff-Chu sequences are sent. Thus, one or more embodiments may improve the operations of wireless communication systems, such as 3G communication systems, 4G/LTE communication systems, LTE-advanced communication systems, 802.11 communication systems, and the like. Further, it is noted that the equations and formulas described above have been provided for purposes of illustration, rather than by way of limitation. Thus, the present disclosure is not to be limited to the exemplary equations and formulas disclosed herein for resolving ambiguity associated with a CFO estimate.

Figure 8A:
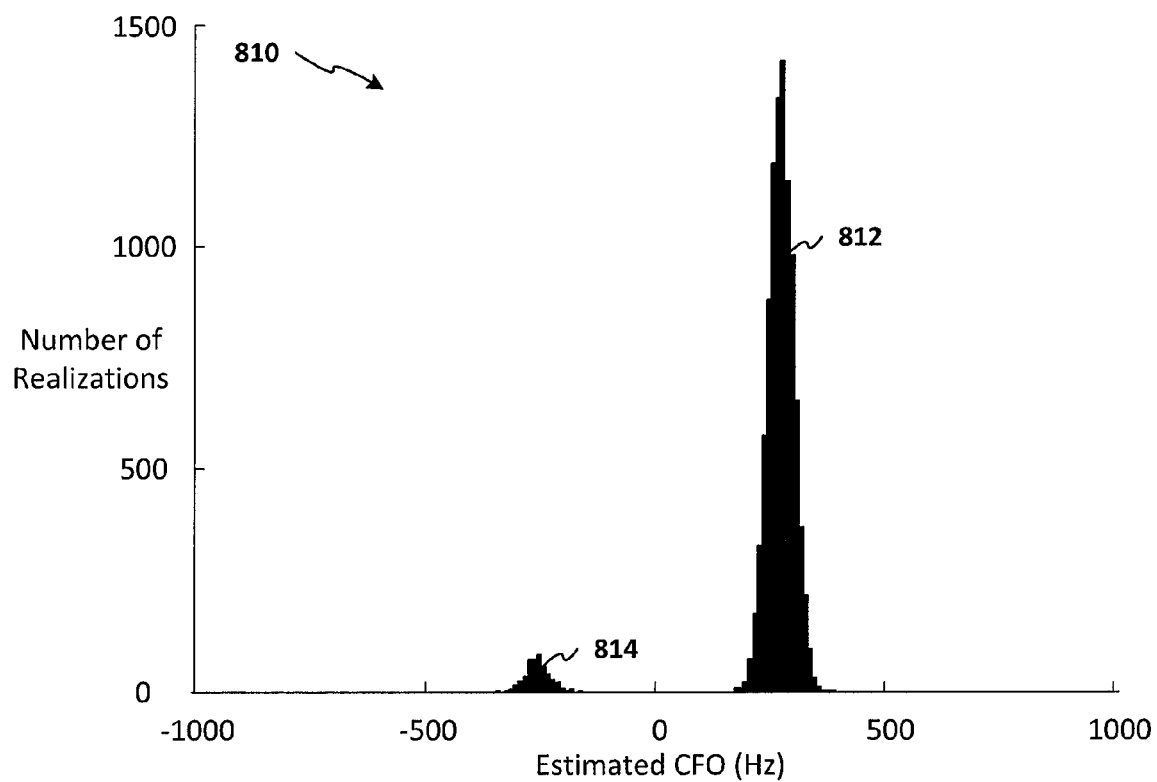
FIGS. 8A and 8B are graphs comparing the accuracy of carrier frequency offset (CFO) estimates determined based on peak correlation power only and for CFO estimates determined according to embodiments.
Figure 8B:
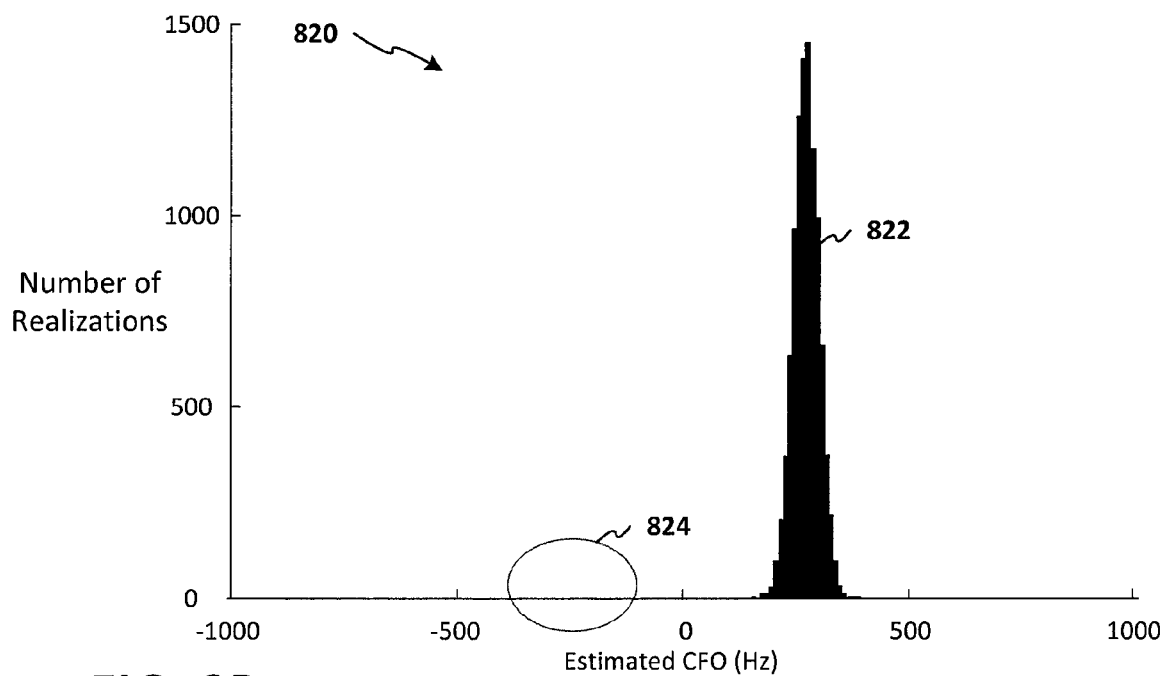

Referring to FIGS. 8A and 8B, graphs comparing the accuracy of carrier frequency offset (CFO) estimates determined based on correlation peak power only and for CFO estimates determined according to embodiments are shown. It is noted that, the CFO estimate realizations illustrated by the graphs of FIGS. 8A and 8B were generated during a simulation of a system (e.g., the system 100 of FIG. 1) where CFO was simulated as 270 Hz in a high speed train scenario at a signal to noise ratio (SNR) of −5 dB. In FIG. 8A, a graph 810 illustrating the accuracy for a number of CFO estimate realizations is shown, where each CFO estimate realization was determined based on correlation peak power only. As indicated at 812, approximately 95.2% of the CFO estimate realizations determined based only on correlation peak power only resulted in the CFO being determined in the correct zone, and, as indicated at 814, approximately 4.8% of the CFO estimate realizations determined based only on correlation peak power only were in the incorrect zone.

By way of contrast, in FIG. 8B, a graph 820 illustrating the accuracy for a number of CFO estimate realizations is shown, where each CFO estimate realization was determined according to embodiments (e.g., CFO estimates determined based on both a power and a phase associated with the correlation peaks). As indicated at 822, 100% of the CFO estimate realizations determined according to embodiments resulted in the CFO being determined in the correct zone, and, as indicated at 824, none of the CFO estimate realizations determined according to embodiments were in the incorrect zone. Thus, FIGS. 8A and 8B illustrate that CFO estimate accuracy according to embodiments may increase the likelihood that the CFO is determined in the correct zone (e.g., the detection window associated with the CFO having the correct sign or region). Therefore, CFO estimate determinations according to embodiments (e.g., CFO estimates determined based on both a power and a phase associated with the correlation peaks) may improve the performance and reduce interference within a wireless communication system (e.g., the system 100 of FIG. 1).

Figure 9A:
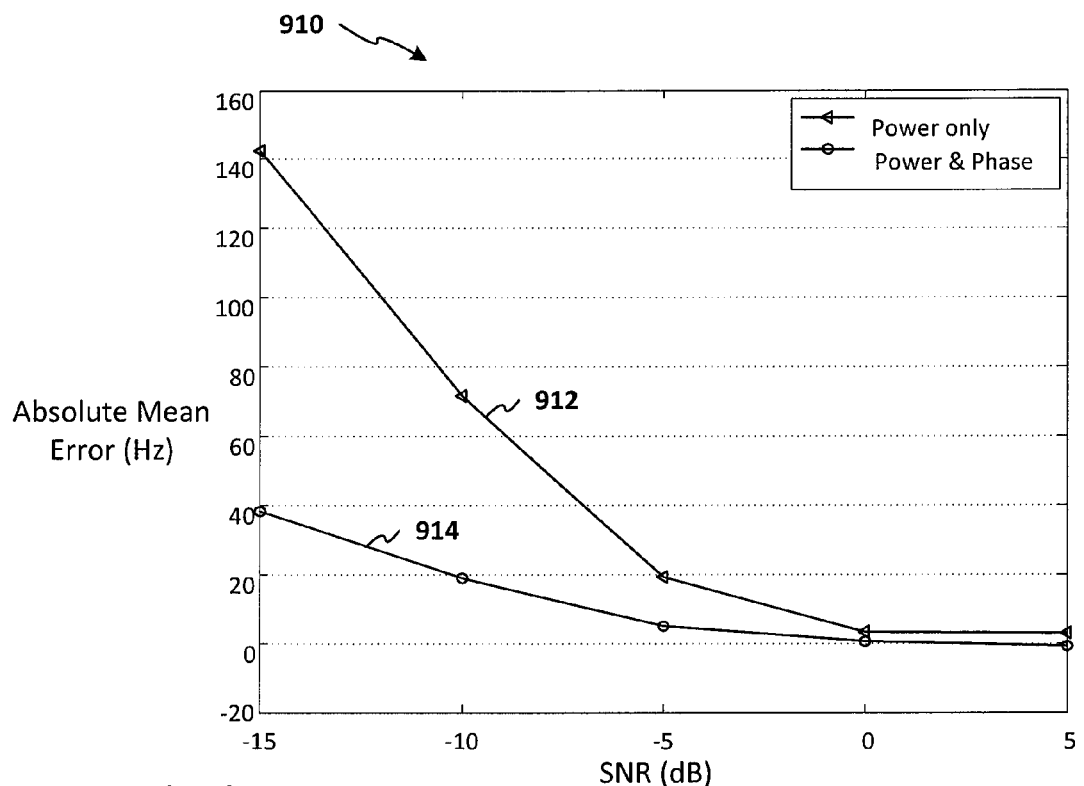
FIGS. 9A and 9B are charts plotting the absolute mean error (in Hz) and the standard deviation of the error (in Hz), respectively, for carrier frequency offset (CFO) estimates determined based on peak correlation power only and for CFO estimates determined according to embodiments.
Figure 9B:
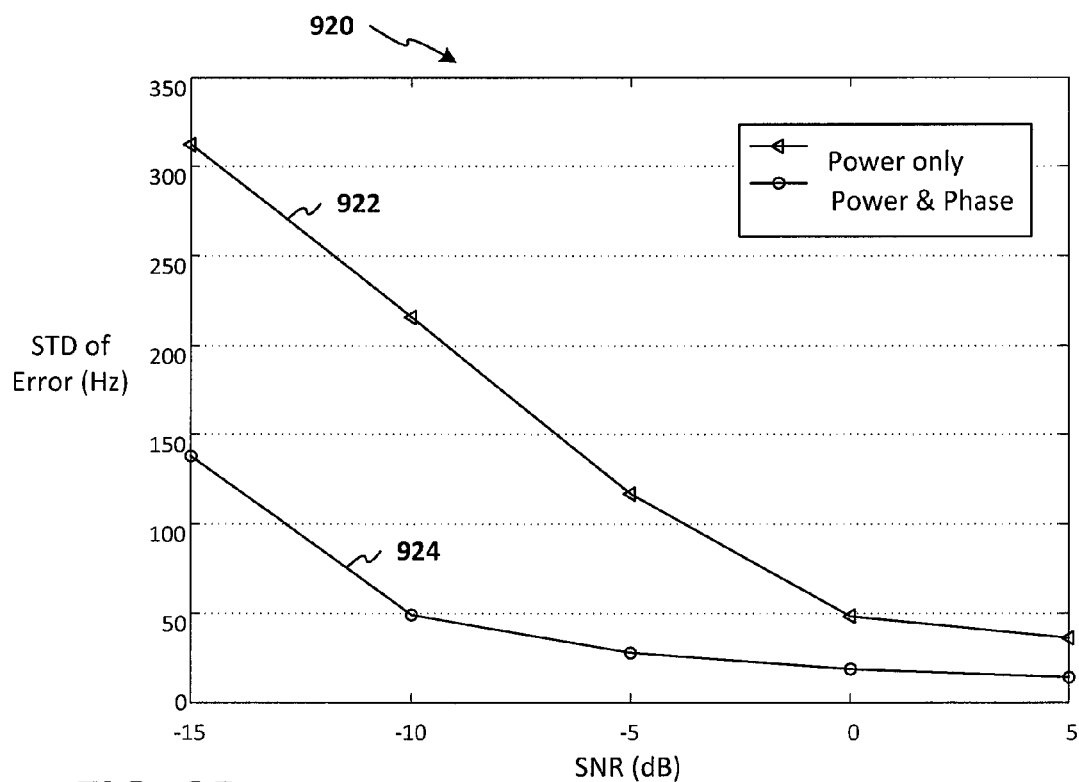

Referring to FIGS. 9A and 9B, charts plotting the absolute mean error (in Hz) and the standard deviation of the error (in Hz), respectively, for carrier frequency offset (CFO) estimates determined based on correlation peak power only and for CFO estimates determined according to embodiments are shown. It is noted that, the plots of FIGS. 9A and 9B were generated during a simulation of a system (e.g., the system 100 of FIG. 1) where CFO was simulated as 270 Hz. In FIG. 9A, a first chart 910 plotting the absolute mean error (in Hz) for CFO estimates determined based on correlation peak power only and for CFO estimates determined according to embodiments are shown. In the first chart 910, a first plot 912 illustrating the absolute mean error (in Hz) for CFO estimates determined based on correlation peak power only is shown, and a second plot 914 illustrating the absolute mean error (in Hz) for CFO estimates determined according to embodiments are shown. As shown in FIG. 9A, the CFO estimates determined according to embodiments may have a reduced absolute mean error (in Hz). Thus, the first chart 910 illustrates that a reduced absolute mean error (in Hz) may be realized when CFO estimates are determined according to embodiments (e.g., CFO estimates determined based on both a power and a phase associated with the correlation peaks), even when the signal to noise ratio (SNR) is low.

In FIG. 9B, a second chart 920 plotting the standard deviation of the error (in Hz) for CFO estimates determined based on correlation peak power only and for CFO estimates determined according to embodiments are shown. In the second chart 920, a first plot 922 illustrating the standard deviation of the error (in Hz) for CFO estimates determined based on correlation peak power only is shown, and a second plot 924 illustrating the standard deviation of the error (in Hz) for CFO estimates determined according to embodiments is shown. As shown in FIG. 9B, the CFO estimates determined according to embodiments may realize a reduced standard deviation of the error (in Hz), even when the SNR is low.

Figure 10A:
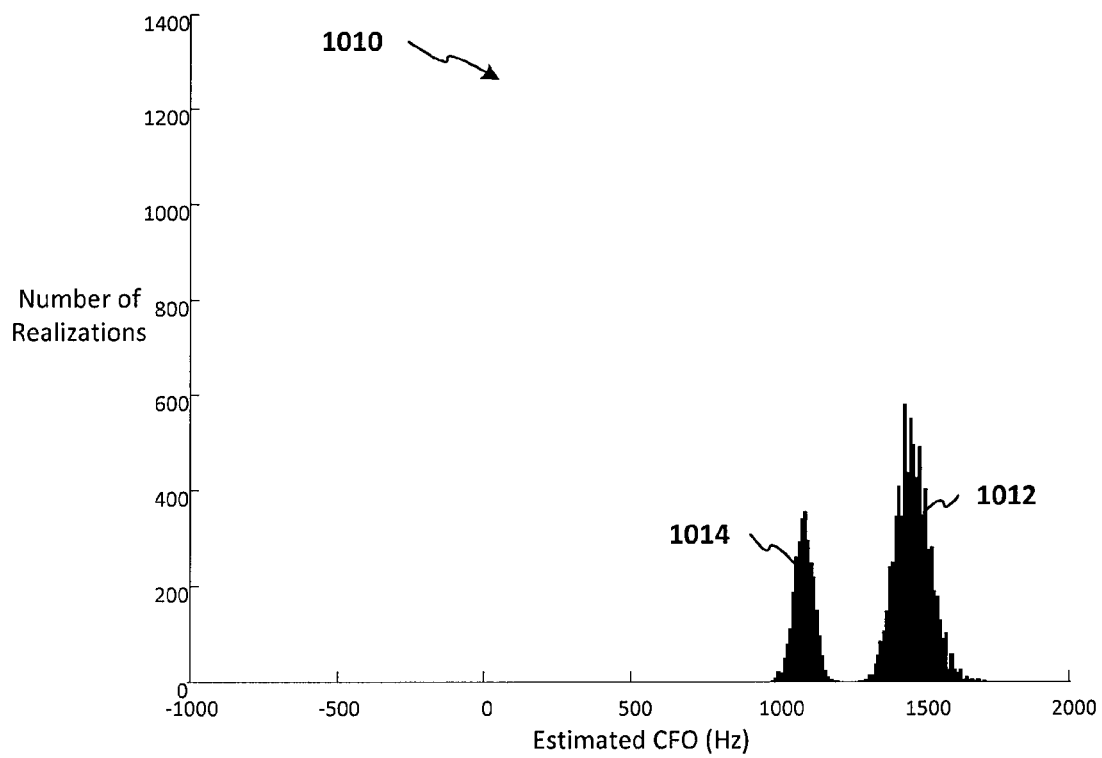
FIGS. 10A and 10B are graphs comparing the accuracy of carrier frequency offset (CFO) estimates determined based on peak correlation power only and for CFO estimates determined according to embodiments.
Figure 10B:
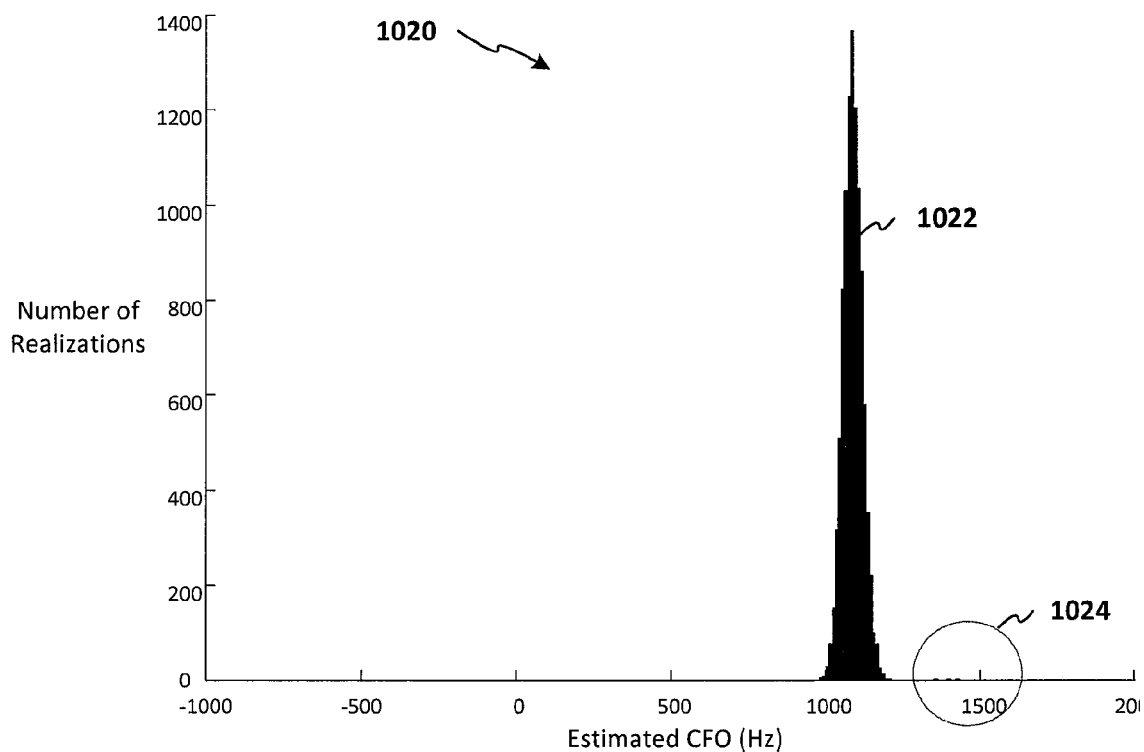

Referring to FIGS. 10A and 10B, graphs comparing the accuracy of carrier frequency offset (CFO) estimates determined based on correlation peak power only and for CFO estimates determined according to embodiments are shown. It is noted that, the graphs of FIGS. 10A and 10B were generated during a simulation of a system (e.g., the system 100 of FIG. 1) where CFO was simulated as 1100 Hz at a signal to noise ratio (SNR) of −5 dB. In FIG. 10A, a first graph 1010 illustrating the accuracy for a number of CFO estimate realizations is shown, where each CFO estimate realization was determined based on correlation peak power only. As indicated at 1012, approximately 28.1% of the CFO estimate realizations determined based only on correlation peak power resulted in the CFO being determined in the correct zone, and, as indicated at 1014, approximately 71.9% of the CFO estimate realizations determined based only on correlation peak power were in the incorrect zone. Thus, FIG. 10A illustrates that a majority of CFO estimates determined based on correlation peak power only are in the incorrect zone when CFO is 1100 Hz.

By way of contrast, in FIG. 10B, a second graph 1020 illustrating the accuracy for a number of CFO estimate realizations is shown, where each CFO estimate realization was determined according to embodiments (e.g., based on correlation peak power and phase information). As indicated at 1022, nearly 100% (e.g., 99.97%) of the CFO estimate realizations determined according to embodiments resulted in the CFO being determined in the correct zone, and, as indicated at 1024, less than 1% (e.g., 0.03%) of the CFO estimate realizations determined according to embodiments were in the incorrect zone. Thus, FIGS. 10A and 10B illustrate that CFO estimate accuracy according to embodiments may increase the likelihood that the CFO is determined in the correct zone (e.g., the left side of 1250 Hz). Therefore, CFO estimate determinations according to embodiments (e.g., CFO estimates determined based on both a power and a phase associated with the peaks) may improve the performance and reduce interference within a wireless communication system (e.g., the system 100 of FIG. 1).

Figure 11A:
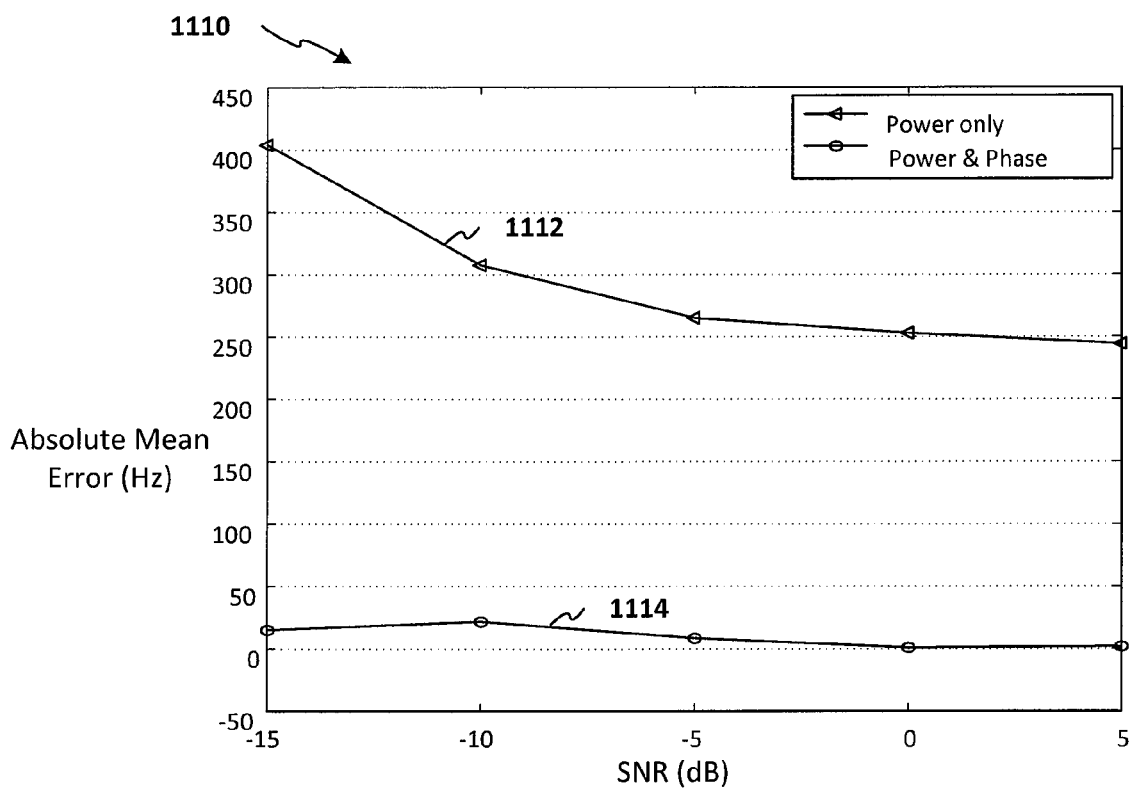
FIGS. 11A and 11B are charts plotting the absolute mean error (in Hz) and the standard deviation of the error (in Hz), respectively, for carrier frequency offset (CFO) estimates determined based on peak correlation power only and for CFO estimates determined according to embodiments.
Figure 11B:
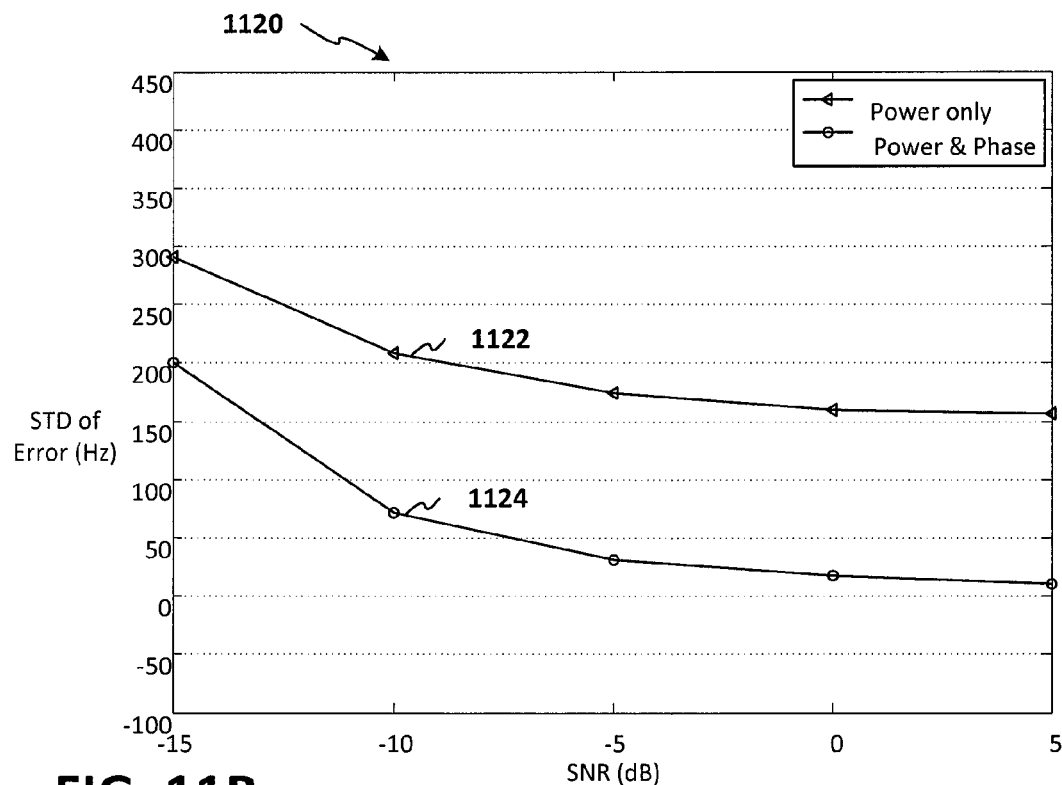

Referring to FIGS. 11A and 11B, charts plotting the absolute mean error (in Hz) and the standard deviation of the error (in Hz), respectively, for carrier frequency offset (CFO) estimates determined based on correlation peak power only and for CFO estimates determined according to embodiments are shown. It is noted that, the plots of FIGS. 11A and 11B were generated during a simulation of a system (e.g., the system 100 of FIG. 1) where CFO was simulated as 1100 Hz. In FIG. 11A, a first chart 1110 plotting the absolute mean error (in Hz) for CFO estimates determined based on correlation peak power only and for CFO estimates determined according to embodiments are shown. In the first chart 1110, a first plot 1112 illustrating the absolute mean error (in Hz) for CFO estimates determined based on correlation peak power only is shown, and a second plot 1114 illustrating the absolute mean error (in Hz) for CFO estimates determined according to embodiments is shown. As shown in FIG. 11A, the CFO estimates determined according to embodiments may have a reduced absolute mean error (in Hz). Thus, the first chart 1110 illustrates that a reduced absolute mean error (in Hz) may be realized when CFO estimates are determined according to embodiments (e.g., CFO estimates determined based on both a power and a phase associated with the correlation peaks), even when the signal to noise ratio (SNR) is low.

In FIG. 11B, a second chart 1120 plotting the standard deviation of the error (in Hz) for CFO estimates determined based on correlation peak power only and for CFO estimates determined according to embodiments are shown. In the second chart 1120, a first plot 1122 illustrating the standard deviation of the error (Hz) for CFO estimates determined based on correlation peak power only is shown, and a second plot 1124 illustrating the standard deviation of the error (in Hz) for CFO estimates determined according to embodiments is shown. As shown in FIG. 11B, the CFO estimates determined according to embodiments may realize a reduced standard deviation of the error (in Hz), even when the SNR is low.

Figure 12A:
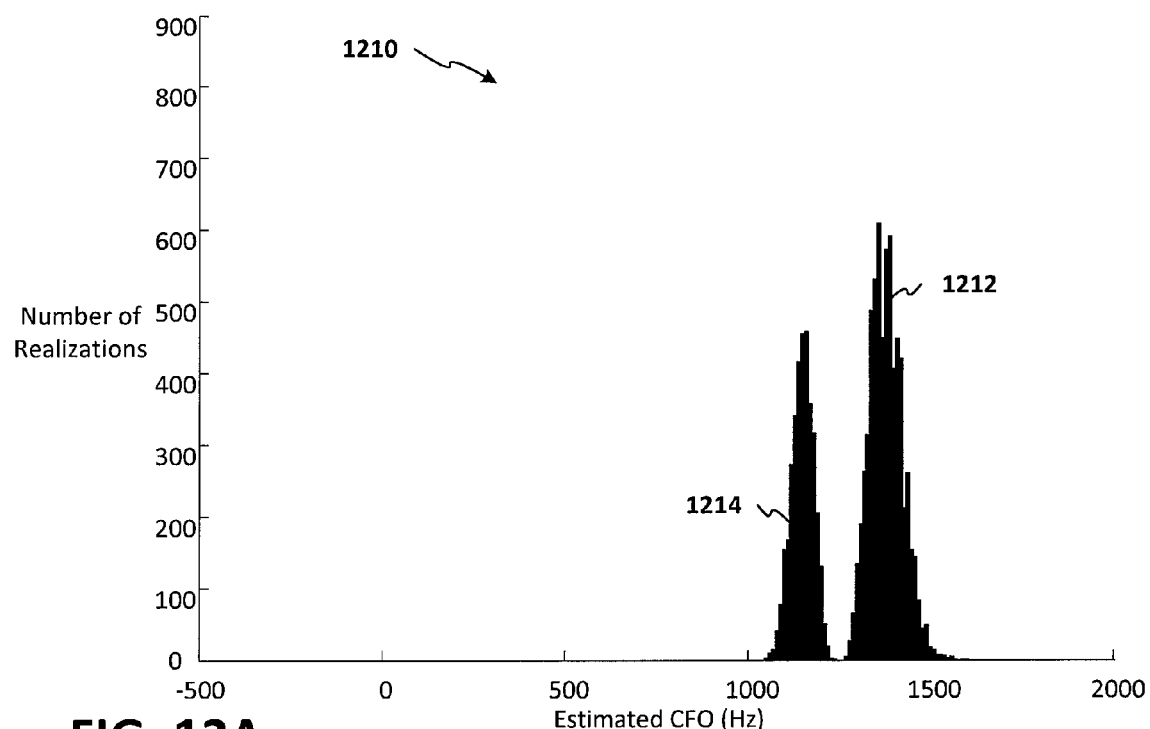
FIGS. 12A and 12B are graphs comparing the accuracy of carrier frequency offset (CFO) estimates determined based on peak correlation power only and for CFO estimates determined according to embodiments.
Figure 12B:
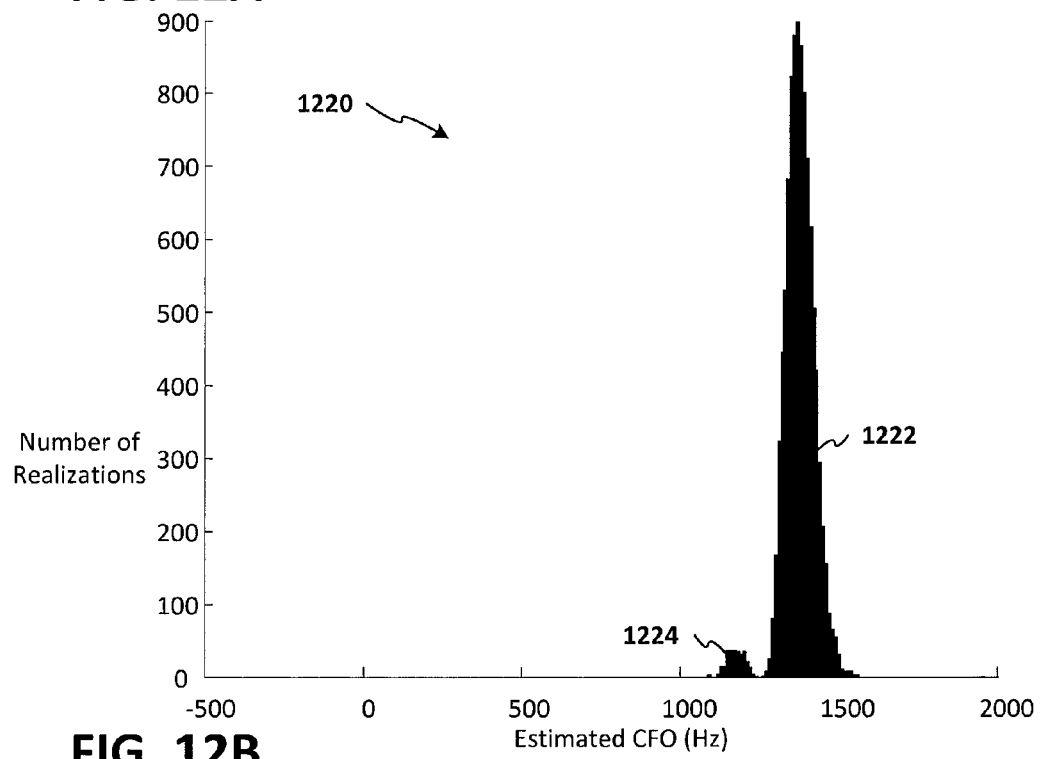

Referring to FIGS. 12A and 12B, graphs comparing the accuracy of carrier frequency offset (CFO) estimates determined based on correlation peak power only and for CFO estimates determined according to embodiments are shown.

It is noted that, the graphs of FIGS. 12A and 12B were generated during a simulation of a system (e.g., the system 100 of FIG. 1) where CFO was simulated as 1340 Hz. In FIG. 12A, a first graph 1210 illustrating the accuracy for a number of CFO estimate realizations is shown, where each CFO estimate realization was determined based on correlation peak power only. As indicated at 1212, approximately 65.1% of the CFO estimate realizations determined based only on correlation peak power resulted in the CFO being determined in the correct zone, and, as indicated at 1214, approximately 34.9% of the CFO estimate realizations determined based only on correlation peak power were in the incorrect zone. Thus, FIG. 12A illustrates that a substantial number of CFO estimates determined based on correlation peak power only are in the incorrect zone when CFO is 1100 Hz.

By way of contrast, in FIG. 12B, a second graph 1220 illustrating the accuracy for a number of CFO estimate realizations at a signal to noise ratio (SNR) of −5 dB is shown, where each CFO estimate realization was determined according to embodiments (e.g., based on correlation peak power and phase information). As indicated at 1222, over 97% (e.g., 97.2%) of the CFO estimate realizations determined according to embodiments resulted in the CFO being determined in the correct zone, and, as indicated at 1224, 2.8% of the CFO estimate realizations determined according to embodiments were in the incorrect zone. Thus, FIGS. 12A and 12B illustrate that CFO estimate accuracy according to embodiments may increase the likelihood that the CFO is determined in the correct zone (e.g., the right side of 1250 Hz). Therefore, CFO estimate determinations according to embodiments (e.g., CFO estimates determined based on both a power and a phase associated with the correlation peaks) may improve the performance and reduce interference within a wireless communication system (e.g., the system 100 of FIG. 1).

Figure 13A:
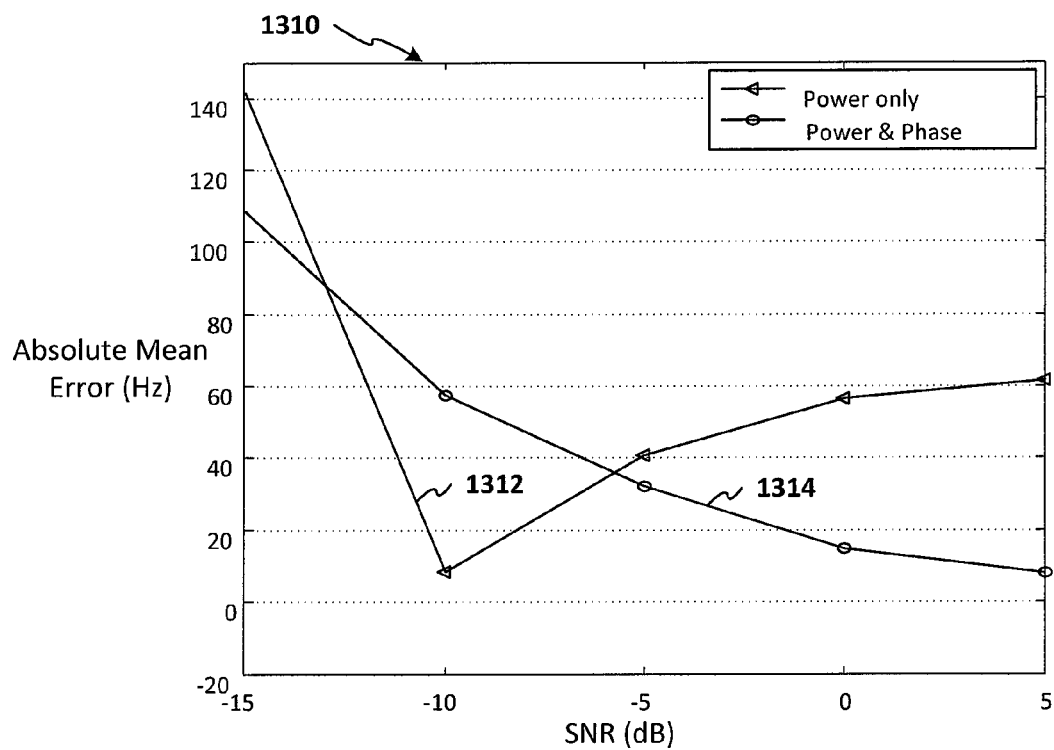
FIGS. 13A and 13B are charts plotting the absolute mean error (in Hz) and the standard deviation of the error (in Hz), respectively, for carrier frequency offset (CFO) estimates determined based on peak correlation power only and for CFO estimates determined according to embodiments.
Figure 13B:
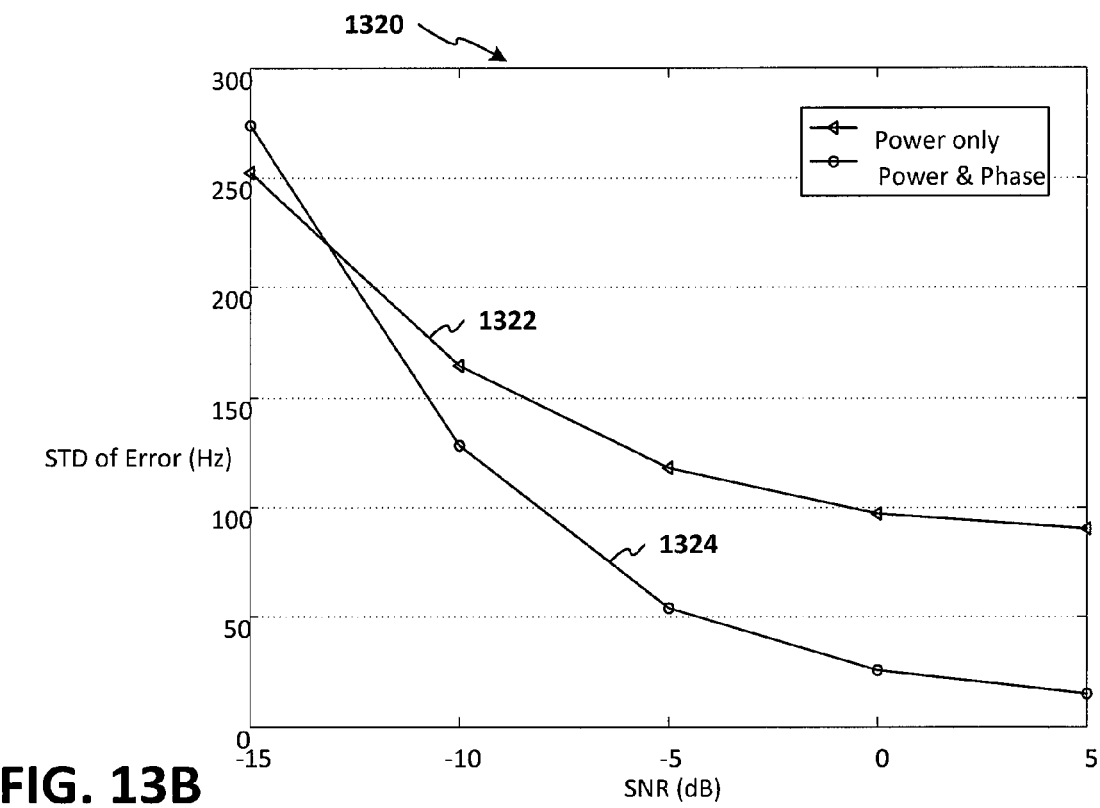

Referring to FIGS. 13A and 13B, charts plotting the absolute mean error (in Hz) and the standard deviation of the error (in Hz), respectively, for carrier frequency offset (CFO) estimates determined based on correlation peak power only and for CFO estimates determined according to embodiments are shown. It is noted that, the plots of FIGS. 13A and 13B were generated during a simulation of a system (e.g., the system 100 of FIG. 1) where CFO was simulated as 1340 Hz. In FIG. 13A, a first chart 1310 plotting the absolute mean error (Hz) for CFO estimates determined based on correlation peak power only and for CFO estimates determined according to embodiments are shown. In the first chart 1310, a first plot 1312 illustrating the absolute mean error (in Hz) for CFO estimates determined based on correlation peak power only is shown, and a second plot 1314 illustrating the absolute mean error (in Hz) for CFO estimates determined according to embodiments is shown. As shown in FIG. 13A, the CFO estimates determined according to embodiments may have a reduced absolute mean error (in Hz). Thus, the first chart 1310 illustrates that a reduced absolute mean error (in Hz) may be realized when CFO estimates are determined according to embodiments (e.g., CFO estimates determined based on both a power and a phase associated with the correlation peaks), even when the signal to noise ratio (SNR) is low.

In FIG. 13B, a second chart 1320 plotting the standard deviation of the error (in Hz) for CFO estimates determined based on correlation peak power only and for CFO estimates determined according to embodiments are shown. In the second chart 1320, a first plot 1322 illustrating the standard deviation of the error (in Hz) for CFO estimates determined based on correlation peak power only is shown, and a second plot 1324 illustrating the standard deviation of the error (in Hz) for CFO estimates determined according to embodiments is shown. As shown in FIG. 13B, the CFO estimates determined according to embodiments may realize a reduced standard deviation of the error (in Hz), even when the SNR is low.

Figure 14:
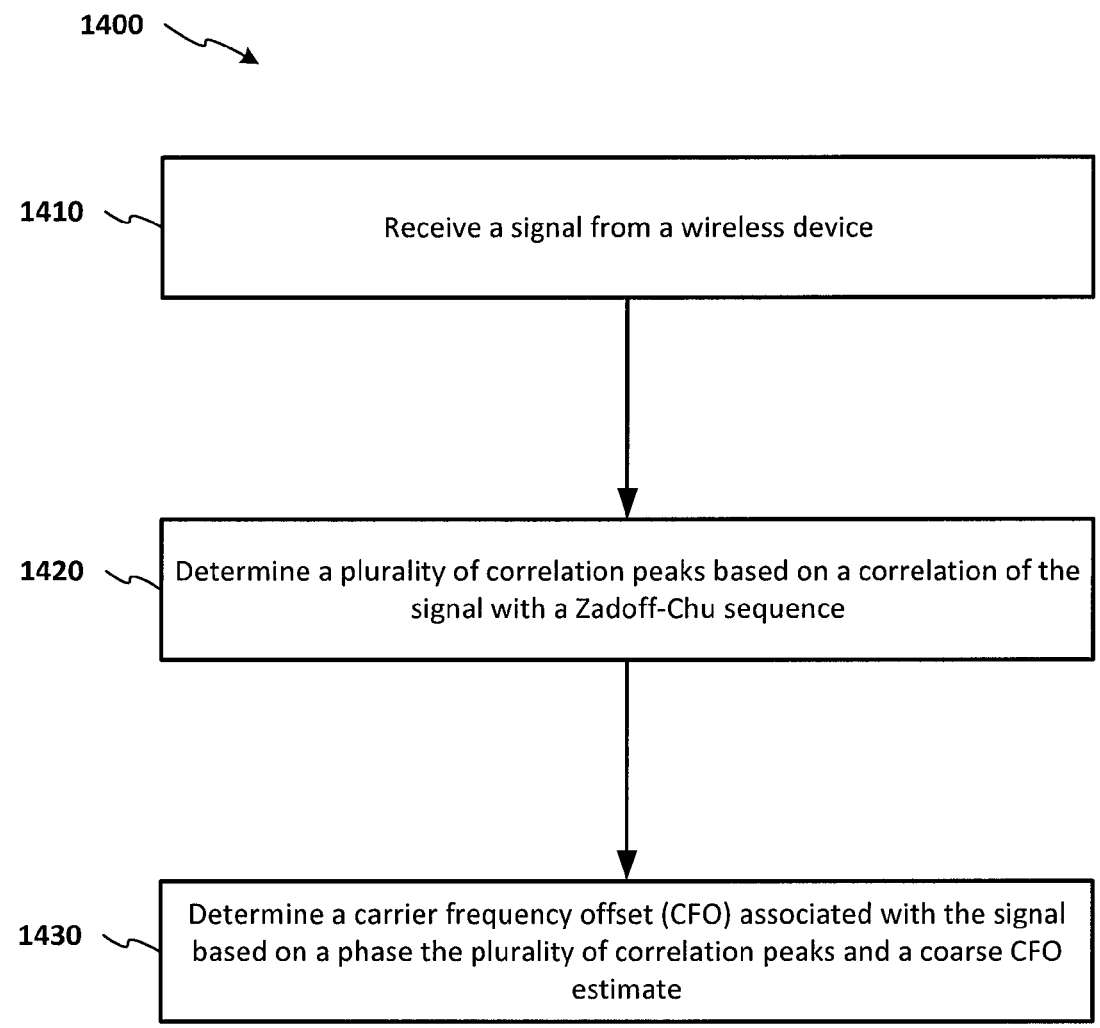
FIG. 14 is a flowchart of an illustrative embodiment of a method for determining a carrier frequency offset (CFO) using phase information associated with a received signal.

Referring to FIG. 14, a flowchart of an illustrative embodiment of a method for determining a carrier frequency offset (CFO) using phase information associated with a received signal is shown as a method 1400. In an embodiment, the method 1400 may be performed by the transceiver 104 of FIG. 1. In an embodiment, the method 1400 may be stored as instructions that, when executed by a processor of the transceiver 104 of FIG. 1, cause the processor to perform the operations of the method 1400, where the instructions may be stored at computer-readable storage medium of the transceiver 104.

At 1410, the method 1400 includes receiving a signal from a wireless device, and, at 1420, determining a plurality of correlation peaks associated with the received signal based on a correlation of the signal with a Zadoff-Chu sequence. At 1430, the method 1400 includes determining a carrier frequency offset (CFO) associated with the signal based on a phase of the plurality of correlation peaks and a coarse CFO estimate. In an embodiment, the coarse CFO estimate may be determined based on the plurality of correlation peaks. For example, the coarse CFO estimate may be determined based on a comparison of squared power ratios associated with the plurality of correlation peaks and squared power ratios associated with one or more CFO candidates. In an embodiment, the one or more CFO candidates may be stored in a lookup table, and the comparison may be performed using the lookup table, as described with reference to FIG. 1.

In an embodiment, the phase associated with the plurality of correlation peaks may include a phase difference between a left correlation peak and a main correlation peak of the plurality of correlation peaks, and a phase difference between a right correlation peak and the main correlation peak of the plurality of correlation peaks, as described with reference to FIG. 1. In an embodiment, the phase differences associated with the left correlation peak and the right correlation peak may be determined based on predetermined theoretical values, as described with reference to FIG. 1. In an embodiment, the theoretical values may be determined based on a preamble index, where the preamble index is determined based on the correlation of the signal and the Zadoff-Chu sequence.

In an embodiment, the method 1400 may be used to perform long term evolution (LTE) high speed mode detection of a signal transmitted using a physical random access channel (PRACH). For example, the method 1400 may be performed during attachment of a wireless device (e.g., the wireless device 102 of FIG. 1) to a transceiver (e.g., the transceiver 104 of FIG. 1) while the wireless device is operating in a high speed train (HST) scenario (or another scenario where the wireless device or the transceiver 104 is travelling at a high rate of speed, such as in an airplane, a boat, another type of land-based vehicle, and the like). By determining the CFO estimate associated with the signal using both the coarse CFO estimate determined based on squared power of the plurality of correlation peaks, and based on the phase of the plurality of correlation peaks, a likelihood that the correct CFO is determined may be increased, as described with reference to at least FIGS. 1 and 7-13B. Furthermore, a CFO determined using the method

1400 may reduce occurrences of inter-carrier interference (ICI) for communication systems utilizing the method 1400 for CFO calculation.

Although the present disclosure and its advantages have been described in detail, it should be understood that various changes, substitutions and alterations can be made herein without departing from the scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the embodiments, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    receiving a signal from a wireless device;
    determining a plurality of correlation peaks based on a correlation of the signal with a Zadoff-Chu sequence;
    determining a coarse carrier frequency offset (CFO) estimate based on a plurality of candidate CFOs, wherein the coarse CFO estimate is determined by:
        determining squared power ratios associated with the plurality of correlation peaks, wherein the squared power ratios include a squared power ratio between a left correlation peak and a main correlation peak of the plurality of correlation peaks and a squared power ratio between a right correlation peak and the main correlation peak of the plurality of correlation peaks;
        comparing the squared power ratios associated with the plurality of correlation peaks to pre-determined values corresponding to squared power ratios associated with corresponding correlation peaks included in each CFO candidate of the plurality of candidate CFOs; and
        identifying the coarse CFO estimate from among the plurality of candidate CFOs based on the comparison of the squared power ratios associated with the plurality of correlation peaks to the squared power ratios of the corresponding correlation peaks included in each candidate CFO of the plurality of candidate CFOs; and
    determining a CFO associated with the signal based on phases of the plurality of correlation peaks and the coarse CFO estimate.

2. The method of claim 1, wherein the signal is received via a physical random access channel (PRACH), wherein the method includes:
    correlating the signal with the Zadoff-Chu sequence to obtain the plurality of correlation peaks and to determine an index associated with the Zadoff-Chu sequence;
    determining a power associated with the plurality of correlation peaks; and
    identifying the phases associated with the plurality of correlation peaks based at least in part on the index.

3. The method of claim 1, wherein the plurality of CFO candidates are stored in a lookup table.

4. The method of claim 1, wherein the squared power ratios associated with the plurality of correlation peaks are compared to the pre-determined values corresponding to the squared power ratios of the corresponding correlation peaks included in each of the plurality of CFO candidates using an objective function $g(f_i)$ given by:

$$g(f_i) = \left(\left|\frac{P_1}{P_0}\right|^2 - r_1(f_i)\right)^2 + \left(\left|\frac{P_{-1}}{P_0}\right|^2 - r_{-1}(f_i)\right)^2,$$

wherein $P_1$ corresponds to a correlation output associated with the right correlation peak, $P_0$ corresponds to a correlation output associated with the main correlation peak, $P_{-1}$ corresponds to a correlation output associated with the left correlation peak, $$\left|\frac{P_1}{P_0}\right|^2$$

is a squared power ratio between the right correlation peak and the main correlation peak, $$\left|\frac{P_{-1}}{P_0}\right|^2$$

is a squared power ratio between the left correlation peak and the main correlation peak, $f_i$ corresponds to a particular known CFO associated with a particular CFO candidate of the plurality of CFO candidates, $r_1(f_i)$ corresponds to a pre-determined value representative of the squared power ratio between a right correlation peak and a main correlation peak of the particular CFO candidate, and wherein $r_{-1}(f_i)$ corresponds to a pre-determined value representative of the squared power ratio between a left correlation peak and the main correlation peak of the particular CFO candidate.

5. The method of claim 4, wherein the coarse CFO estimate is determined according to:

$$\Delta f_{coarse} = \arg\min_{f_i}(g(f_i)),$$

wherein $\arg\min_{f_i}(g(f_i))$ identifies a CFO candidate associated with a smallest difference between the squared power ratios of the plurality of correlation peaks and the corresponding correlation peaks of the plurality of CFO candidates.

6. The method of claim 1, wherein the method includes:
    determining whether the coarse CFO estimate corresponds to a region of CFO ambiguity; and
    in response to a determination that the CFO corresponds to the region of CFO ambiguity, identifying a CFO region associated with the CFO associated with the received signal.

7. The method of claim 6, wherein the region of CFO ambiguity is one of a plurality of regions of CFO ambiguity, the plurality of regions of CFO ambiguity including a first region of CFO ambiguity, a second region of CFO ambiguity, and a third region of CFO ambiguity, wherein the first region of CFO ambiguity is associated with a normalized CFO around 0, wherein the second region of CFO ambiguity is associated with a normalized CFO around positive 1, wherein the third region of CFO ambiguity is associated with a normalized CFO around negative 1, wherein the normalized CFO is around 0 when the sub-carrier spacing is 1250 Hz and the CFO is between −500 Hz and 500 Hz, wherein the normalized CFO is around positive 1 when the sub-carrier spacing is 1250 Hz and the CFO is between 1000 Hz and 1500 Hz, and wherein the normalized CFO is around negative 1 when the sub-carrier spacing is 1250 Hz and the CFO is between −1500 Hz and −1000 Hz.

8. The method of claim 7, wherein the identified CFO region indicates whether the CFO of the received signal is within the first region of CFO ambiguity, the second region of CFO ambiguity, or the third region of CFO ambiguity, and wherein the method includes determining whether the CFO of the received signal is on a first side or a second side of the identified CFO region.

9. The method of claim 8, wherein a determination of whether the CFO is on the first side or the second side of the identified CFO region is based at least in part on the phases of the plurality of correlation peaks.

10. The method of claim 9, wherein the plurality of correlation peaks includes the left correlation peak, the main correlation peak, and the right correlation peak, and wherein, when the identified CFO region corresponds to the first region of CFO ambiguity, determining whether the CFO is on the first side or the second side includes evaluating $\delta_1 < \delta_2$, $$\delta_1 = \left[\angle\left(\frac{P_1}{P_0}\right) - a_1(0 < \Delta f < \Delta F)\right]^2 + \left[\angle\left(\frac{P_{-1}}{P_0}\right) - a_{-1}(0 < \Delta f < \Delta F)\right]^2; \text{ and}$$

$$\delta_2 = \left[\angle\left(\frac{P_1}{P_0}\right) - a_1(-\Delta F < \Delta f < 0)\right]^2 + \left[\angle\left(\frac{P_{-1}}{P_0}\right) - a_{-1}(-\Delta F < \Delta f < 0)\right]^2,$$

wherein $\delta_1$ is representative of the sum of a distance between a first theoretical value and a phase difference between the right correlation peak and the main correlation peak when $0<\Delta f<\Delta F$ and a distance between a second theoretical value and a phase difference between the left correlation peak and the main correlation peak when $0<\Delta f<\Delta F$, wherein $\delta_2$ is representative of the sum of a distance between a third theoretical value and the phase difference between the right correlation peak and the main correlation peak when $-\Delta F<\Delta f<0$ and a distance between a fourth theoretical value and the phase difference between the left correlation peak and the main correlation peak when $-\Delta F<\Delta f<0$, wherein $\Delta F$ is the sub-carrier spacing, wherein $$\angle\left(\frac{P_1}{P_0}\right)$$

is the phase difference between the right correlation peak and the main correlation peak, wherein $$\angle\left(\frac{P_{-1}}{P_0}\right)$$

is the phase difference between the left correlation peak and the main correlation peak, wherein $\alpha_1$ has the first theoretical value when the received signal is associated with a particular preamble index of the Zadoff-Chu sequence and $0<\Delta f<\Delta F$, wherein $\alpha_{-1}$ has the second theoretical value when the received signal is associated with the particular preamble index of the Zadoff-Chu sequence and $0<\Delta f<\Delta F$, wherein $\alpha_1$ has the third theoretical value when the received signal is associated with the particular preamble index of the Zadoff-Chu sequence and $(-\Delta F<\Delta f<0)$, wherein $\alpha_{-1}$ has the fourth theoretical value when the received signal is associated with the particular preamble index of the Zadoff-Chu sequence and $-\Delta F<\Delta f<0$, wherein $\theta f$ is the CFO estimate, wherein the CFO of the received signal is $|\Delta f|$ when $\delta_1 < \delta_2$, wherein the CFO of the received signal is $-|\Delta f|$ otherwise, where $\Delta f$ corresponds to the first side of the identified CFO region, and wherein $-|\Delta f|$ corresponds to the second side of the identified CFO region.

11. The method of claim 9, wherein the plurality of correlation peaks includes the left correlation peak, the main correlation peak, and the right correlation peak, and wherein, when the identified CFO region corresponds to the second region of CFO ambiguity, determining whether the CFO is on the first side or the second side includes evaluating $\delta_1 < \delta_2$, wherein:

$$\delta_1 = \left[\angle\left(\frac{P_1}{P_0}\right) - \alpha_1(0 < \Delta f < \Delta F)\right]^2; \text{ and}$$

$$\delta_2 = \left[\angle\left(\frac{P_1}{P_0}\right) - \alpha_1(\Delta f > \Delta F)\right]^2,$$

wherein $\delta_1$ is representative of a distance between a first theoretical value and a phase difference between the right correlation peak and the main correlation peak when $0<\Delta f<\Delta F$, wherein $\delta_2$ is representative of a distance between a second theoretical value and the phase difference between the right correlation peak and the main correlation peak when $\Delta f>\Delta F$, wherein $P_1$ is the right correlation peak, wherein $P_0$ is the main correlation peak, wherein $\alpha_1$ has the first theoretical value when the received signal is associated with a particular preamble index of the Zadoff-Chu sequence and $0<\Delta f<\Delta F$, wherein $\alpha_1$ has the second theoretical value when the received signal is associated with the particular preamble index of the Zadoff-Chu sequence and $\Delta f>\Delta F$, wherein $$\angle\left(\frac{P_1}{P_0}\right)$$

is the phase difference between the right correlation peak and the main correlation peak, wherein $\Delta F$ is the sub-carrier spacing, wherein $\Delta f$ is the CFO estimate, and wherein the CFO is determined by:

$$CFO_{final} = \begin{cases} \underset{f_i < \Delta F}{\operatorname{argmin}}\left(\left|\frac{P_1}{P_0}\right|^2 - r_1(f_i)\right)^2 + \left(\left|\frac{P_{-1}}{P_0}\right|^2 - r_{-1}(f_i)\right)^2, & \text{if } \delta_1 < \delta_2 \\ \underset{f_i > \Delta F}{\operatorname{argmin}}\left(\left|\frac{P_1}{P_0}\right|^2 - r_1(f_i)\right)^2 + \left(\left|\frac{P_{-1}}{P_0}\right|^2 - r_{-1}(f_i)\right)^2, & \text{otherwise} \end{cases},$$

wherein $CFO_{final}$ is the CFO of the received signal, $f_i$ is a known CFO associated with a particular CFO candidate, $$\left|\frac{P_1}{P_0}\right|^2$$

is a squared power ratio between the right correlation peak and the main correlation peak, $$\left|\frac{P_{-1}}{P_0}\right|^2$$

is a squared power ratio between the left correlation peak and the main correlation peak, $r_1(f_i)$ is the squared power ratio between a right correlation peak of the particular CFO candidate and a main correlation peak of the particular CFO candidate, and $r_{-1}(f_i)$ is the squared power ratio between a left correlation peak of the particular CFO candidate and the main correlation peak of the particular CFO candidate.

12. The method of claim 9, wherein the plurality of correlation peaks includes the left correlation peak, the main correlation peak, and the right correlation peak, and wherein, when the identified CFO region corresponds to the third region of CFO ambiguity, determining whether the CFO is on the first side or the second side includes evaluating $\delta_1 < \delta_2$, wherein:

$$\delta_1 = \left[\angle\left(\frac{P_{-1}}{P_0}\right) - a_{-1}(\Delta f < (-\Delta F))\right]^2, \text{ and}$$

$$\delta_2 = \left[\angle\left(\frac{P_{-1}}{P_0}\right) - a_{-1}((-\Delta F) < \Delta f < 0)\right]^2,$$

wherein $\delta_1$ is a distance between a first theoretical value and a phase difference between the left correlation peak and the main correlation peak, wherein $\delta_2$ is a distance between a second theoretical value and the phase difference between the left correlation peak and the main correlation peak, wherein $P_{-1}$ is the left correlation peak, wherein $P_0$ is the main correlation peak, wherein $\alpha_{-1}$ has the first theoretical value when the received signal is associated with a particular preamble index of the Zadoff-Chu sequence and $\Delta f < (-\Delta F)$, wherein $\alpha_{-1}$ has the second theoretical value when the received signal is associated with the particular preamble index of the Zadoff-Chu sequence and $$(-\Delta F) < \Delta f < 0, \text{ wherein } \angle\left(\frac{P_{-1}}{P_0}\right)$$

is the phase difference between the left correlation peak and the main correlation peak, wherein $\Delta F$ is the sub-carrier spacing, wherein $\Delta f$ is the CFO estimate, and wherein the CFO of the received signal is determined by:

$$CFO_{final} = \begin{cases} \operatorname*{argmin}_{f_i < (-\Delta F)}\left(\left|\frac{P_1}{P_0}\right|^2 - r_1(f_i)\right)^2 + \left(\left|\frac{P_{-1}}{P_0}\right|^2 - r_{-1}(f_i)\right)^2, & \text{if } \delta_1 < \delta_2; \\ \operatorname*{argmin}_{f_i > (-\Delta F)}\left(\left|\frac{P_1}{P_0}\right|^2 - r_1(f_i)\right)^2 + \left(\left|\frac{P_{-1}}{P_0}\right|^2 - r_{-1}(f_i)\right)^2 & \text{otherwise} \end{cases},$$

wherein $CFO_{final}$ is the CFO of the received signal, $f_i$ is a known CFO associated with a particular CFO candidate, $$\left|\frac{P_1}{P_0}\right|^2$$

is a squared power ratio between the right correlation peak and the main correlation peak, $$\left|\frac{P_{-1}}{P_0}\right|^2$$

is a squared power ratio between the left correlation peak and the main correlation peak, $r_1(f_i)$ is the squared power ratio between a right correlation peak of the particular CFO candidate and a main correlation peak of the particular CFO candidate, and $r_{-1}(f_i)$ is the squared power ratio between a left correlation peak of the particular CFO candidate and the main correlation peak of the particular CFO candidate.

13. A non-transitory computer-readable storage medium storing instructions that, when executed by a processor, cause the processor to perform operations comprising:
receiving a signal from a wireless device;
determining a plurality of correlation peaks based on a correlation of the signal with a Zadoff-Chu sequence;
determining a coarse carrier frequency offset (CFO) estimate based on a plurality of candidate CFOs, wherein the coarse CFO estimate is determined by:
determining squared power ratios associated with the plurality of correlation peaks, wherein the squared power ratios include a squared power ratio between a left correlation peak and a main correlation peak of the plurality of correlation peaks and a squared power ratio between a right correlation peak and the main correlation peak of the plurality of correlation peaks;
comparing the squared power ratios associated with the plurality of correlation peaks to pre-determined values corresponding to squared power ratios associated with corresponding correlation peaks included in each CFO candidate of the plurality of candidate CFOs; and
identifying the coarse CFO estimate from among the plurality of candidate CFOs based on the comparison of the squared power ratios associated with the plurality of correlation peaks to the squared power ratios of the corresponding correlation peaks included in each candidate CFO of the plurality of candidate CFOs; and
determining a CFO associated with the signal based on phases of the plurality of correlation peaks and the coarse CFO estimate.

14. The non-transitory computer-readable storage medium of claim 13, wherein the plurality of CFO candidates are stored in a lookup table.

15. The non-transitory computer-readable storage medium of claim 13, wherein the squared power ratios associated with the plurality of correlation peaks are compared to the squared power ratios of the corresponding correlation peaks included in each of the plurality of CFO candidates using an objective function $g(f_i)$ given by:

$$g(f_i) = \left(\left|\frac{P_1}{P_0}\right|^2 - r_1(f_i)\right)^2 + \left(\left|\frac{P_{-1}}{P_0}\right|^2 - r_{-1}(f_i)\right)^2,$$

wherein $P_1$ corresponds to a correlation output associated with the right correlation peak, $P_0$ corresponds to a correlation output associated with the main correlation peak, $P_{-1}$ corresponds to a correlation output associated with the left correlation peak, $$\left|\frac{P_1}{P_0}\right|^2$$

is the squared power ratio between the right correlation peak and the main correlation peak, $$\left|\frac{P_{-1}}{P_0}\right|^2$$

is a squared power ratio between the left correlation peak and the main correlation peak, $f_i$ corresponds to a particular known CFO associated with a particular CFO candidate of the plurality of CFO candidates, $r_1(f_i)$ corresponds to a pre-determined value representative of the squared power ratio between a right correlation peak and a main correlation peak of the particular CFO candidate, and $r_{-1}(f_i)$ corresponds to a pre-determined value representative of the squared power ratio between a left correlation peak and the main correlation peak of the particular CFO candidate.

16. The non-transitory computer-readable storage medium of claim 15, wherein the coarse CFO estimate is determined according to:

$$\Delta f_{coarse} = \arg\min_{f_i}(g(f_i)),$$

wherein $\arg\min_{f_i}(g(f_i))$ identifies a CFO candidate associated with a smallest difference between the squared power ratios of the plurality of correlation peaks and the corresponding correlation peaks of the plurality of CFO candidates.

17. The non-transitory computer-readable storage medium of claim 13, wherein the operations include:
  determining whether the coarse CFO estimate corresponds to a region of CFO ambiguity; and
  in response to a determination that the CFO corresponds to the region of CFO ambiguity, identifying a CFO region associated with the CFO associated with the received signal.

18. The non-transitory computer-readable storage medium of claim 17, wherein the region of CFO ambiguity is one of a plurality of regions of CFO ambiguity, the plurality of regions of CFO ambiguity including a first region of CFO ambiguity, a second region of CFO ambiguity, and a third region of CFO ambiguity, wherein the first region of CFO ambiguity is associated with a normalized CFO around 0, wherein the second region of CFO ambiguity is associated with a normalized CFO around positive 1, wherein the third region of CFO ambiguity is associated with a normalized CFO around negative 1, wherein the normalized CFO is around 0 when the sub-carrier spacing is 1250 Hz and the CFO is between −500 Hz and 500 Hz, wherein the normalized CFO is around positive 1 when the sub-carrier spacing is 1250 Hz and the CFO is between 1000 Hz and 1500 Hz, and wherein the normalized CFO is around negative 1 when the sub-carrier spacing is 1250 Hz and the CFO is between −1500 Hz and −1000 Hz.

19. The non-transitory computer-readable storage medium of claim 18, wherein the CFO region indicates whether the CFO of the received signal is within the first region of CFO ambiguity, the second region of CFO ambiguity, or the third region of CFO ambiguity, and wherein the operations include determining whether the CFO of the received signal is on a first side or a second side of the identified CFO region.

20. The non-transitory computer-readable storage medium of claim 19, wherein the plurality of correlation peaks includes the left correlation peak, the main correlation peak, and the right correlation peak, and wherein, when the identified CFO region corresponds to the first region of CFO ambiguity, determining whether the CFO is on the first side or the second side includes evaluating $\delta_1 < \delta_2$, $$\delta_1 = \left[\angle\left(\frac{P_1}{P_0}\right) - a_1(0 < \Delta f < \Delta F)\right]^2 + \left[\angle\left(\frac{P_{-1}}{P_0}\right) - a_{-1}(0 < \Delta f < \Delta F)\right]^2; \text{ and}$$

$$\delta_2 = \left[\angle\left(\frac{P_1}{P_0}\right) - a_1(-\Delta F < \Delta f < 0)\right]^2 + \left[\angle\left(\frac{P_{-1}}{P_0}\right) - a_{-1}(-\Delta F < \Delta f < 0)\right]^2,$$

wherein $\delta_1$ is representative of the sum of a distance between a first theoretical value and a phase difference between the right correlation peak and the main correlation peak when $0 < \Delta f < \Delta F$ and a distance between a second theoretical value and a phase difference between the left correlation peak and the main correlation peak when $0 < \Delta f < \Delta F$, wherein $\delta_2$ is representative of the sum of a distance between a third theoretical value and the phase difference between the right correlation peak and the main correlation peak when $-\Delta F < \Delta f < 0$ and a distance between a fourth theoretical value and the phase difference between the left correlation peak and the main correlation peak when $-\Delta F < \Delta f < 0$, wherein $\Delta F$ is the sub-carrier spacing, wherein $$\angle\left(\frac{P_1}{P_0}\right)$$

is the phase difference between the right correlation peak and the main correlation peak, wherein $$\angle\left(\frac{P_{-1}}{P_0}\right)$$

is the phase difference between the left correlation peak and the main correlation peak, wherein $\alpha_1$ has the first theoretical value when the received signal is associated with a particular preamble index of the Zadoff-Chu sequence and $0 < \Delta f < \Delta F$, wherein $\alpha_{-1}$ has the second theoretical value when the received signal is associated with the particular preamble index of the Zadoff-Chu sequence and $0 < \Delta f < \Delta F$, wherein $\alpha_1$ has the third theoretical value when the received signal is associated with the particular preamble index of the Zadoff-Chu sequence and $(-\Delta F < \Delta f < 0)$, wherein $\alpha_{-1}$ has the fourth theoretical value when the received signal is associated with the particular preamble index of the Zadoff-Chu sequence and $-\Delta F < \Delta f < 0$, wherein $\Delta f$ is the CFO estimate, wherein the CFO of the received signal is $|\Delta f|$ when $\delta_1 < \delta_2$, wherein the CFO of the received signal is $-|\Delta f|$ otherwise, where $\Delta f$ corresponds to the first side of the identified CFO region, and wherein $-|\Delta f|$ corresponds to the second side of the identified CFO region.

21. The non-transitory computer-readable storage medium of claim 19, wherein the plurality of correlation peaks includes the left correlation peak, the main correlation peak, and the right correlation peak, and wherein, when the identified CFO region corresponds to the second region of CFO ambiguity, determining whether the CFO is on the first side or the second side includes evaluating $\delta_1<\delta_2$, wherein:

$$\delta_1 = \left[\angle\left(\frac{P_1}{P_0}\right) - a_1(0<\Delta f<\Delta F)\right]^2; \text{ and}$$

$$\delta_2 = \left[\angle\left(\frac{P_1}{P_0}\right) - a_1(\Delta f>\Delta F)\right]^2,$$

wherein $\delta_1$ is representative of a distance between a first theoretical value and a phase difference between the right correlation peak and the main correlation peak when $0<\Delta f<\Delta F$, wherein $\delta_2$ is representative of a distance between a second theoretical value and the phase difference between the right correlation peak and the main correlation peak when $\Delta f>\Delta F$, wherein $P_1$ is the right correlation peak, wherein $P_0$ is the main correlation peak, wherein $\alpha_1$ has the first theoretical value when the received signal is associated with a particular preamble index of the Zadoff-Chu sequence and $0<\Delta f<\Delta F$, wherein $\alpha_1$ has the second theoretical value when the received signal is associated with the particular preamble index of the Zadoff-Chu sequence and $$\Delta f > \Delta F, \text{ wherein } \angle\left(\frac{P_1}{P_0}\right)$$

is the phase difference between the right correlation peak and the main correlation peak, wherein $\Delta F$ is the sub-carrier spacing, wherein $\Delta f$ is the CFO estimate, and wherein the CFO is determined by:

$$CFO_{final} = \begin{cases} \underset{f_i<\Delta F}{\operatorname{argmin}}\left(\left|\frac{P_1}{P_0}\right|^2 - r_1(f_i)\right)^2 + \left(\left|\frac{P_{-1}}{P_0}\right|^2 - r_{-1}(f_i)\right)^2, & \text{if } \delta_1<\delta_2 \\ \underset{f_i>\Delta F}{\operatorname{argmin}}\left(\left|\frac{P_1}{P_0}\right|^2 - r_1(f_i)\right)^2 + \left(\left|\frac{P_{-1}}{P_0}\right|^2 - r_{-1}(f_i)\right)^2, & \text{otherwise} \end{cases},$$

wherein $CFO_{final}$ is the CFO of the received signal, $f_i$ is a known CFO associated with a particular CFO candidate, $$\left|\frac{P_1}{P_0}\right|^2$$

is a squared power ratio between the right correlation peak and the main correlation peak, $$\left|\frac{P_{-1}}{P_0}\right|^2$$

is a squared power ratio between the left correlation peak and the main correlation peak, $r_1(f_i)$ is the squared power ratio between a right correlation peak of the particular CFO candidate and a main correlation peak of the particular CFO candidate, and $r_{-1}(f_i)$ is the squared power ratio between a left correlation peak of the particular CFO candidate and the main correlation peak of the particular CFO candidate.

22. The non-transitory computer-readable storage medium of claim 19, wherein the plurality of correlation peaks includes the left correlation peak, the main correlation peak, and the right correlation peak, and wherein, when the identified CFO region corresponds to the third region of CFO ambiguity, determining whether the CFO is on the first side or the second side includes evaluating $\delta_1<\delta_2$, wherein:

$$\delta_1 = \left[\angle\left(\frac{P_{-1}}{P_0}\right) - a_{-1}(\Delta f<(-\Delta F))\right]^2, \text{ and}$$

$$\delta_2 = \left[\angle\left(\frac{P_{-1}}{P_0}\right) - a_{-1}((-\Delta F)<\Delta f<0)\right]^2,$$

wherein $\delta_1$ is a distance between a first theoretical value and a phase difference between the left correlation peak and the main correlation peak, wherein $\delta_2$ is a distance between a second theoretical value and the phase difference between the left correlation peak and the main correlation peak, wherein $P_{-1}$ is the left correlation peak, wherein $P_0$ is the main correlation peak, wherein $\alpha_{-1}$ has the first theoretical value when the received signal is associated with a particular preamble index of the Zadoff-Chu sequence and $\Delta f<(-\Delta F)$, wherein $\alpha_{-1}$ has the second theoretical value when the received signal is associated with the particular preamble index of the Zadoff-Chu sequence and $$(-\Delta F) < \Delta f < 0, \text{ wherein } \angle\left(\frac{P_{-1}}{P_0}\right)$$

is the phase difference between the left correlation peak and the main correlation peak, wherein $\Delta F$ is the sub-carrier spacing, wherein $\Delta f$ is the CFO estimate, and wherein the CFO of the received signal is determined by:

$$CFO_{final} = \begin{cases} \underset{f_i<(-\Delta F)}{\operatorname{argmin}}\left(\left|\frac{P_1}{P_0}\right|^2 - r_1(f_i)\right)^2 + \left(\left|\frac{P_{-1}}{P_0}\right|^2 - r_{-1}(f_i)\right)^2, & \text{if } \delta_1<\delta_2; \\ \underset{f_i>(-\Delta F)}{\operatorname{argmin}}\left(\left|\frac{P_1}{P_0}\right|^2 - r_1(f_i)\right)^2 + \left(\left|\frac{P_{-1}}{P_0}\right|^2 - r_{-1}(f_i)\right)^2 & \text{otherwise} \end{cases},$$

wherein $CFO_{final}$ is the CFO of the received signal, $f_i$ is a known CFO associated with a particular CFO candidate, $$\left|\frac{P_1}{P_0}\right|^2$$

is a squared power ratio between the right correlation peak and the main correlation peak, $$\left|\frac{P_{-1}}{P_0}\right|^2$$

is a squared power ratio between the left correlation peak and the main correlation peak, $r_1(f_i)$ is the squared power ratio between a right correlation peak of the particular CFO candidate and a main correlation peak of the particular CFO candidate, and $r_{-1}(f_i)$ is the squared power ratio between a left correlation peak of the particular CFO candidate and the main correlation peak of the particular CFO candidate.

23. The non-transitory computer-readable storage medium of claim 13, wherein the phases of the plurality of correlation peaks are determined based at least in part on theoretical values associated with the plurality of correlation peaks, and wherein the theoretical values are determined based on an index of the Zadoff-Chu sequence.

24. An apparatus comprising:
at least one processor configured to:
  receive a signal from a wireless device;
  determine a plurality of correlation peaks based on a correlation of the signal with a Zadoff-Chu sequence;
  determine a coarse carrier frequency offset (CFO) estimate based on a plurality of candidate CFOs, wherein the coarse CFO estimate is determined by:
    determining squared power ratios associated with the plurality of correlation peaks, wherein the squared power ratios include a squared power ratio between a left correlation peak and a main correlation peak of the plurality of correlation peaks and a squared power ratio between a right correlation peak and the main correlation peak of the plurality of correlation peaks;
    comparing the squared power ratios associated with the plurality of correlation peaks to pre-determined values corresponding to squared power ratios associated with corresponding correlation peaks included in each CFO candidate of the plurality of candidate CFOs; and
    identifying the coarse CFO estimate from among the plurality of candidate CFOs based on the comparison of the squared power ratios associated with the plurality of correlation peaks to the squared power ratios of the corresponding correlation peaks included in each candidate CFO of the plurality of candidate CFOs; and
  determine a CFO associated with the signal based on phases of the plurality of correlation peaks and the coarse CFO estimate; and
a memory coupled to the processor.

25. The apparatus of claim 24, wherein the signal is received via a physical random access channel (PRACH), wherein the at least one processor is configured to:
  correlate the signal with the Zadoff-Chu sequence to obtain the plurality of correlation peaks and to determine an index associated with the Zadoff-Chu sequence; and
  identify the phases associated with the plurality of correlation peaks based at least in part on the index.

26. The apparatus of claim 24, wherein the plurality of CFO candidates are stored in a lookup table.

27. The apparatus of claim 24, wherein the squared power ratios associated with the plurality of correlation peaks are compared to the pre-determined values corresponding to the squared power ratios of the corresponding correlation peaks included in each of the plurality of CFO candidates using an objective function $g(f_i)$ given by:

$$g(f_i) = \left(\left|\frac{P_1}{P_0}\right|^2 - r_1(f_i)\right)^2 + \left(\left|\frac{P_{-1}}{P_0}\right|^2 - r_{-1}(f_i)\right)^2,$$

wherein $P_1$ corresponds to a correlation output associated with the right correlation peak, $P_0$ corresponds to a correlation output associated with the main correlation peak, $P_{-1}$ corresponds to a correlation output associated with the left correlation peak, $$\left|\frac{P_1}{P_0}\right|^2$$

is a squared power ratio between the right correlation peak and the main correlation peak, $$\left|\frac{P_{-1}}{P_0}\right|^2$$

is a squared power ratio between the left correlation peak and the main correlation peak, $f_i$ corresponds to a particular known CFO associated with a particular CFO candidate of the plurality of CFO candidates, $r_1(f_i)$ corresponds to a pre-determined value representative of the squared power ratio between a right correlation peak and a main correlation peak of the particular CFO candidate, and $r_{-1}(f_i)$ corresponds to a pre-determined value representative of the squared power ratio between a left correlation peak and the main correlation peak of the particular CFO candidate.

28. The apparatus of claim 27, wherein the coarse CFO estimate is determined according to:

$$\Delta f_{coarse} = \arg\min_{f_i}(g(f_i)),$$

wherein $\arg\min_{f_i}(g(f_i))$ identifies a CFO candidate associated with a smallest difference between the squared power ratios of the plurality of correlation peaks and the corresponding correlation peaks of the plurality of CFO candidates.

29. The apparatus of claim 24, wherein the at least one processor is configured to:
  determine whether the coarse CFO estimate corresponds to a region of CFO ambiguity; and
  in response to a determination that the CFO corresponds to the region of CFO ambiguity, identifying a CFO region associated with the CFO associated with the received signal.

30. The apparatus of claim 29, wherein the region of CFO ambiguity is one of a plurality of regions of CFO ambiguity, the plurality of regions of CFO ambiguity including a first region of CFO ambiguity, a second region of CFO ambiguity, and a third region of CFO ambiguity, wherein the first region of CFO ambiguity is associated with a normalized CFO around 0, wherein the second region of CFO ambiguity is associated with a normalized CFO around positive 1, wherein the third region of CFO ambiguity is associated with a normalized CFO around negative 1, wherein the normalized CFO is around 0 when the sub-carrier spacing is 1250 Hz and the CFO is between −500 Hz and 500 Hz, wherein the normalized CFO is around positive 1 when the sub-carrier spacing is 1250 Hz and the CFO is between 1000 Hz and 1500 Hz, and wherein the normalized CFO is around negative 1 when the sub-carrier spacing is 1250 Hz and the CFO is between −1500 Hz and −1000 Hz.

31. The apparatus of claim 30, wherein the identified CFO region indicates whether the CFO of the received signal is within the first region of CFO ambiguity, the second region of CFO ambiguity, or the third region of CFO ambiguity, and wherein the at least one processor is configured to determine whether the CFO of the received signal is on a first side or a second side of the identified CFO region.

32. The apparatus of claim 31, wherein a determination of whether the CFO is on the first side or the second side of the identified CFO region is based at least in part on the phases of the plurality of correlation peaks.

33. The apparatus of claim 32, wherein the plurality of correlation peaks includes the left correlation peak, the main correlation peak, and the right correlation peak, and wherein, when the identified CFO region corresponds to the first region of CFO ambiguity, determining whether the CFO is on the first side or the second side includes evaluating $\delta_1 < \delta_2$, $$\delta_1 = \left[\angle\left(\frac{P_1}{P_0}\right) - a_1(0 < \Delta f < \Delta F)\right]^2 + \left[\angle\left(\frac{P_{-1}}{P_0}\right) - a_{-1}(0 < \Delta f < \Delta F)\right]^2; \text{ and}$$

$$\delta_2 = \left[\angle\left(\frac{P_1}{P_0}\right) - a_1(-\Delta F < \Delta f < 0)\right]^2 + \left[\angle\left(\frac{P_{-1}}{P_0}\right) - a_{-1}(-\Delta F < \Delta f < 0)\right]^2,$$

wherein $\delta_1$ is representative of the sum of a distance between a first theoretical value and a phase difference between the right correlation peak and the main correlation peak when $0 < \Delta f < \Delta F$ and a distance between a second theoretical value and a phase difference between the left correlation peak and the main correlation peak when $0 < \Delta f < \Delta F$, wherein $\delta_2$ is representative of the sum of a distance between a third theoretical value and the phase difference between the right correlation peak and the main correlation peak when $-\Delta F < \Delta f < 0$ and a distance between a fourth theoretical value and the phase difference between the left correlation peak and the main correlation peak when $-\Delta F < \Delta f < 0$, wherein $\Delta F$ is the sub-carrier spacing, wherein $$\angle\left(\frac{P_1}{P_0}\right)$$

is the phase difference between the right correlation peak and the main correlation peak, wherein $$\angle\left(\frac{P_{-1}}{P_0}\right)$$

is the phase difference between the left correlation peak and the main correlation peak, wherein $\alpha_1$ has the first theoretical value when the received signal is associated with a particular preamble index of the Zadoff-Chu sequence and $0 < \Delta f < \Delta F$, wherein $\alpha_{-1}$ has the second theoretical value when the received signal is associated with the particular preamble index of the Zadoff-Chu sequence and $0 < \Delta f < \Delta F$, wherein $\alpha_1$ has the third theoretical value when the received signal is associated with the particular preamble index of the Zadoff-Chu sequence and ($-\Delta F < \Delta f < 0$), wherein $\alpha_{-1}$ has the fourth theoretical value when the received signal is associated with the particular preamble index of the Zadoff-Chu sequence and $-\Delta F < \Delta f < 0$, wherein $\Delta f$ is the CFO estimate, wherein the CFO of the received signal is $|\Delta f|$ when $\delta_1 < \delta_2$, wherein the CFO of the received signal is $-|\Delta f|$ otherwise, where $\Delta f$ corresponds to the first side of the identified CFO region, and wherein $-|\Delta f|$ corresponds to the second side of the identified CFO region.

34. The apparatus of claim 32, wherein the plurality of correlation peaks includes the left correlation peak, the main correlation peak, and the right correlation peak, and wherein, when the identified CFO region corresponds to the second region of CFO ambiguity, determining whether the CFO is on the first side or the second side includes evaluating $\delta_1 < \delta_2$, wherein:

$$\delta_1 = \left[\angle\left(\frac{P_1}{P_0}\right) - \alpha_1(0 < \Delta f < \Delta F)\right]^2; \text{ and}$$

$$\delta_2 = \left[\angle\left(\frac{P_1}{P_0}\right) - \alpha_1(\Delta f > \Delta F)\right]^2,$$

wherein $\delta_1$ is representative of a distance between a first theoretical value and a phase difference between the right correlation peak and the main correlation peak when $0 < \Delta f < \Delta F$, wherein $\delta_2$ is representative of a distance between a second theoretical value and the phase difference between the right correlation peak and the main correlation peak when $\Delta f > \Delta F$, wherein $P_1$ is the right correlation peak, wherein $P_0$ is the main correlation peak, wherein $\alpha_1$ has the first theoretical value when the received signal is associated with a particular preamble index of the Zadoff-Chu sequence and $0 < \Delta f < \Delta F$, wherein $\alpha_1$ has the second theoretical value when the received signal is associated with the particular preamble index of the Zadoff-Chu sequence and $$\Delta f > \Delta F, \text{ wherein } \angle\left(\frac{P_1}{P_0}\right)$$

is the phase difference between the right correlation peak and the main correlation peak, wherein $\Delta F$ is the sub-carrier spacing, wherein $\Delta f$ is the CFO estimate, and wherein the CFO is determined by:

$$CFO_{final} = \begin{cases} \operatorname*{argmin}_{f_i < \Delta F}\left(\left|\frac{P_1}{P_0}\right|^2 - r_1(f_i)\right)^2 + \left(\left|\frac{P_{-1}}{P_0}\right|^2 - r_{-1}(f_i)\right)^2, & \text{if } \delta_1 < \delta_2 \\ \operatorname*{argmin}_{f_i > \Delta F}\left(\left|\frac{P_1}{P_0}\right|^2 - r_1(f_i)\right)^2 + \left(\left|\frac{P_{-1}}{P_0}\right|^2 - r_{-1}(f_i)\right)^2, & \text{otherwise} \end{cases},$$

wherein $CFO_{final}$ is the CFO of the received signal, $f_i$ is a known CFO associated with a particular CFO candidate, $$\left|\frac{P_1}{P_0}\right|^2$$

is a squared power ratio between the right correlation peak and the main correlation peak, $$\left|\frac{P_{-1}}{P_0}\right|^2$$

is a squared power ratio between the left correlation peak and the main correlation peak, $r_1(f_i)$ is the squared power ratio between a right correlation peak of the particular CFO candidate and a main correlation peak of the particular CFO candidate, and $r_{-1}(f_i)$ is the squared power ratio between a left correlation peak of the particular CFO candidate and the main correlation peak of the particular CFO candidate.

35. The apparatus of claim 32, wherein the plurality of correlation peaks includes the left correlation peak, the main correlation peak, and the right correlation peak, and wherein, when the identified CFO region corresponds to the third region of CFO ambiguity, determining whether the CFO is on the first side or the second side includes evaluating $\delta_1 < \delta_2$, wherein:

$$\delta_1 = \left[\angle\left(\frac{P_{-1}}{P_0}\right) - a_{-1}(\Delta f < (-\Delta F))\right]^2, \text{ and}$$

$$\delta_2 = \left[\angle\left(\frac{P_{-1}}{P_0}\right) - a_{-1}((-\Delta f) < \Delta f < 0)\right]^2,$$

wherein $\delta_1$ is a distance between a first theoretical value and a phase difference between the left correlation peak and the main correlation peak, wherein $\delta_2$ is a distance between a second theoretical value and the phase difference between the left correlation peak and the main correlation peak, wherein $P_{-1}$ is the left correlation peak, wherein $P_0$ is the main correlation peak, wherein $\alpha_{-1}$ has the first theoretical value when the received signal is associated with a particular preamble index of the Zadoff-Chu sequence and $\Delta f < (-\Delta F)$, wherein $\alpha_{-1}$ has the second theoretical value when the received signal is associated with the particular preamble index of the Zadoff-Chu sequence and $$(-\Delta F) < \Delta f < 0, \text{ wherein } \angle\left(\frac{P_{-1}}{P_0}\right)$$

is the phase difference between the left correlation peak and the main correlation peak, wherein $\Delta F$ is the sub-carrier spacing, wherein $\Delta f$ is the CFO estimate, and wherein the CFO of the received signal is determined by:

$$CFO_{final} = \begin{cases} \underset{f_i < (-\Delta F)}{\operatorname{argmin}}\left(\left|\frac{P_1}{P_0}\right|^2 - r_1(f_i)\right)^2 + \left(\left|\frac{P_{-1}}{P_0}\right|^2 - r_{-1}(f_i)\right)^2, & \text{if } \delta_1 < \delta_2; \\ \underset{f_i > (-\Delta F)}{\operatorname{argmin}}\left(\left|\frac{P_1}{P_0}\right|^2 - r_1(f_i)\right)^2 + \left(\left|\frac{P_{-1}}{P_0}\right|^2 - r_{-1}(f_i)\right)^2 & \text{otherwise} \end{cases},$$

wherein $CFO_{final}$ is the CFO of the received signal, $f_i$ is a known CFO associated with a particular CFO candidate, $$\left|\frac{P_1}{P_0}\right|^2$$

is a squared power ratio between the right correlation peak and the main correlation peak, $$\left|\frac{P_{-1}}{P_0}\right|^2$$

is a squared power ratio between the left correlation peak and the main correlation peak, $r_1(f_i)$ is the squared power ratio between a right correlation peak of the particular CFO candidate and a main correlation peak of the particular CFO candidate, and $r_{-1}(f_i)$ is the squared power ratio between a left correlation peak of the particular CFO candidate and the main correlation peak of the particular CFO candidate.

36. The apparatus of claim 24, wherein the phases associated with the plurality of correlation peaks are determined based at least in part on theoretical values associated with the plurality of correlation peaks, and wherein the theoretical values are determined based on an index of the Zadoff-Chu sequence.

* * * * *

UNITED STATES PATENT AND TRADEMARK OFFICE
CERTIFICATE OF CORRECTION

PATENT NO. : 9,491,024 B2
APPLICATION NO. : 14/614157
DATED : November 8, 2016
INVENTOR(S) : Yuxian Zhang et al.

It is certified that error appears in the above-identified patent and that said Letters Patent is hereby corrected as shown below:

On the Title Page

Item (57), delete the last sentence of the abstract reading "The course CFO estimate may be determined based on a squared power ratio of particular pairs of the plurality of correlation peaks and the phases may be used to remove ambiguity associated with the coarse CFO estimate." replace with --The course CFO estimate may be determined based on a squared power ratio of particular pairs of the plurality of correlation peaks, and the phases may be used to remove ambiguity associated with the coarse CFO estimate.--.

In the Drawings

Sheet 10, Fig. 10B, the rightmost value along the Estimated CFO (Hz) axis should read --2000--.

In the Specification

Column 18, Line number 15, delete "a" and replace with --σ--.

In the Claims

At Column 30, Claim number 10, Line number 5, delete "θf" and replace with --Δf--.

At Column 35, Claim number 21, Line numbers 40-45, delete both portions of the equation reading "$\arg\min_{f_l < \Delta F}$" and replace those portions with --$\arg\min_{f_i < \Delta F}$--.

At Column 36, Claim number 22, Line numbers 42-48, delete both portions of the equation reading "$\arg\min_{f_l < \Delta F}$" and replace those portions with --$\arg\min_{f_i < \Delta F}$--.

Signed and Sealed this
Twenty-first Day of March, 2017

Michelle K. Lee
*Director of the United States Patent and Trademark Office*

CERTIFICATE OF CORRECTION (continued)
U.S. Pat. No. 9,491,024 B2

At Column 41, Claim number 35, Line number 15, delete the portion of the equation reading "$((-\Delta f)$" and replace with --$((-\Delta F)$--.